(12) United States Patent
Murata et al.

(10) Patent No.: US 12,512,467 B2
(45) Date of Patent: Dec. 30, 2025

(54) ACTIVE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Yoshiaki Murata, Kawasaki (JP); Yasuhiro Harada, Isehara (JP); Kazuki Ise, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 706 days.

(21) Appl. No.: 17/896,269

(22) Filed: Aug. 26, 2022

(65) Prior Publication Data

US 2023/0290940 A1 Sep. 14, 2023

(30) Foreign Application Priority Data

Mar. 14, 2022 (JP) .................................. 2022-039232

(51) Int. Cl.
*H01M 4/485* (2010.01)
*H01M 10/0525* (2010.01)
(Continued)

(52) U.S. Cl.
CPC ....... *H01M 4/485* (2013.01); *H01M 10/0525* (2013.01); *H01M 50/284* (2021.01);
(Continued)

(58) Field of Classification Search
None
See application file for complete search history.

(56) References Cited

U.S. PATENT DOCUMENTS

| 10,862,118 B2 | 12/2020 | Harada et al. |
| 10,957,906 B2 | 3/2021 | Harada et al. |

(Continued)

FOREIGN PATENT DOCUMENTS

| CN | 105633456 A | 6/2016 |
| CN | 109473641 A | 3/2019 |

(Continued)

OTHER PUBLICATIONS

Lin et al., "$TiNb_6O_{17}$: a new electrode material for lithium-ion batteries", Chemical Communications 51, 2015, 8 pages.

(Continued)

*Primary Examiner* — Zhongqing Wei
(74) *Attorney, Agent, or Firm* — Oblon, McClelland, Maier & Neustadt, L.L.P.

(57) ABSTRACT

According to one embodiment, an active material is provided. The active material includes a primary particle including an $Nb_{10}Ti_2O_{29}$ phase and at least one Nb-rich phase selected from an $Nb_{14}TiO_{37}$ phase and an $Nb_{24}TiO_{64}$ phase. In the primary particle, a ratio $M_{Nb}/M_{Ti}$ of substance amount of niobium to titanium satisfies $5.0 < M_{Nb}/M_{Ti} \leq 24.0$. A diffraction chart according to a wide angle X-ray diffraction method using a CuKα ray for the active material includes a peak A and a peak C attributed to the $Nb_{10}Ti_2O_{29}$ phase and a peak B appearing within a range of 2θ of $25.5 \pm 0.2°$ attributed to the Nb-rich phase. The active material satisfies a peak intensity ratio represented by $0 < I_B/I_A < 5.0$. A half width of the peak C is in a range of 0.15° or more and 0.80° or less.

13 Claims, 9 Drawing Sheets

(51) Int. Cl.
H01M 50/284 (2021.01)
H01M 50/296 (2021.01)
H01M 4/02 (2006.01)

(52) U.S. Cl.
CPC .... H01M 50/296 (2021.01); *H01M 2004/021* (2013.01); *H01M 2004/027* (2013.01); *H01M 2220/20* (2013.01)

(56) References Cited

U.S. PATENT DOCUMENTS

| | | | |
|---|---|---|---|
| 2014/0120404 A1 | 5/2014 | Ise et al. | |
| 2019/0296343 A1* | 9/2019 | Harada | H01M 4/366 |
| 2021/0066711 A1 | 3/2021 | Lu et al. | |
| 2021/0376307 A1 | 12/2021 | Harada et al. | |

FOREIGN PATENT DOCUMENTS

| | | |
|---|---|---|
| EP | 3 915 941 A1 | 12/2021 |
| JP | 2014-103110 A | 6/2014 |
| JP | 2019-169343 A | 10/2019 |
| JP | 2021-190250 A | 12/2021 |

OTHER PUBLICATIONS

Gasperin, "Affinement de la structure de $TiNb_2O_7$ et repartition des cations", Journal of Solid State Chemistry 53, 1984, 9 pages (with English Machine Translation).

Japanese Office Action issued Mar. 25, 2025 in Japanese Patent Application No. 2022-039232, (with unedited computer-generated English translation), 5 pages.

* cited by examiner

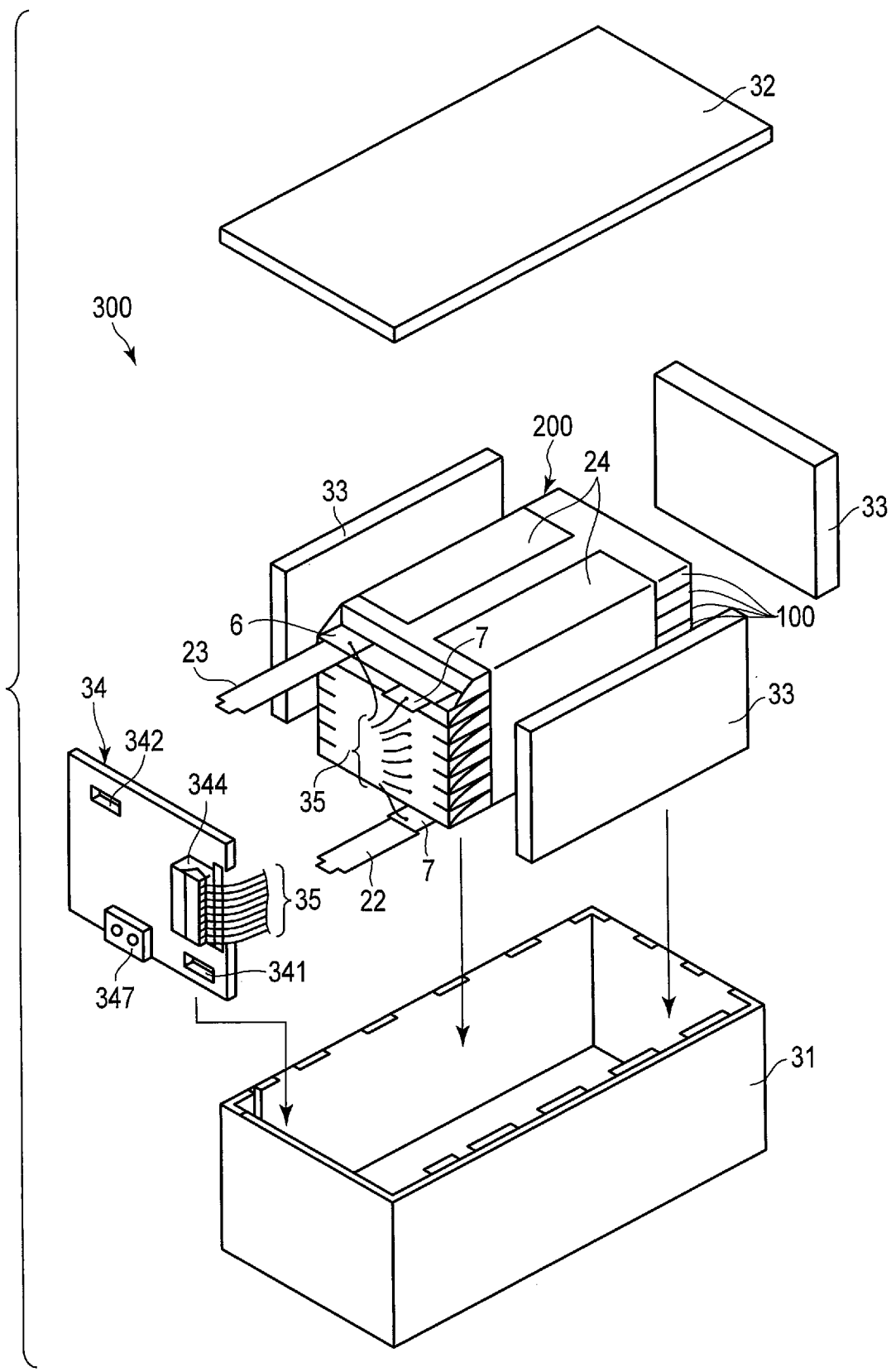
F I G. 8

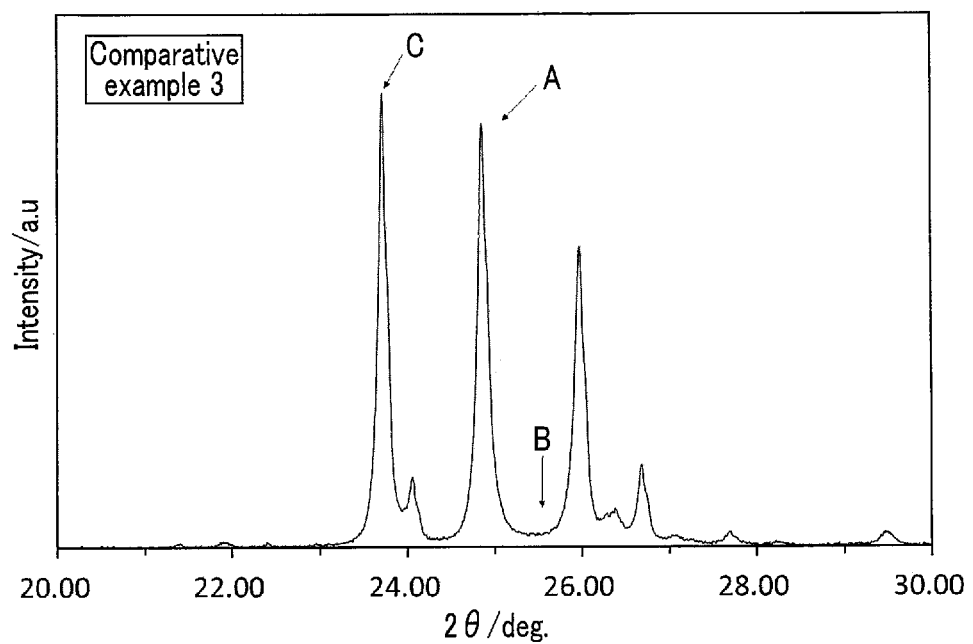
F I G. 14

ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2022-039232, filed Mar. 14, 2022, the entire contents of which are incorporated herein by reference.

FIELD

Embodiments described herein relate generally to an active material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric automobiles, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, an electrode potential of an oxide of titanium is about 1.5 V (vs. Li/Li$^+$) with respect to metallic lithium electrode, which is higher (more noble) compared to potentials of a carbon-based negative electrodes. The potential of an oxide of titanium is electrochemically restricted due to being caused by oxidation-reduction reactions between Ti$^{3+}$ and Ti$^{4+}$ upon insertion and extraction of lithium. In addition, there is also a fact that rapid charge and discharge of lithium ions can be stably performed at a high electrode potential of about 1.5 V (vs. Li/Li$^+$). Therefore, it has been conventionally difficult to reduce the electrode potential in order to improve the energy density.

On the other hand, considering the capacity per unit weight, the theoretical capacity of titanium dioxide (anatase structure) is about 165 mAh/g, and the theoretical capacity of spinel lithium-titanium composite oxides such as Li$_4$Ti$_5$O$_{12}$ is about 180 mAh/g. On another hand, the theoretical capacity of a general graphite based electrode material is 385 mAh/g and greater. As such, the capacity density of an oxide of titanium is significantly lower than that of the carbon based negative electrode material. This is due to there being few lithium-insertion sites in the crystal structure, and lithium tending to be stabilized in the structure, and thus, substantial capacity being reduced.

In view of the above circumstances, a new electrode material containing Ti and Nb has been studied. Such a niobium-titanium composite oxide material is expected to have a high charge/discharge capacity. In particular, a composite oxide represented by TiNb$_2$O$_7$ has a high theoretical capacity exceeding 380 mAh/g. Therefore, the niobium-titanium composite oxide is expected as a high-capacity material in place of Li$_4$Ti$_5$O$_{12}$; however, there is room for improvement in output performance and cycle life performance.

BRIEF DESCRIPTION OF THE DRAWINGS

FIG. 8 is an exploded perspective view schematically illustrating an example of a battery pack according to an embodiment.

FIG. 14 is a diagram illustrating a diffraction chart obtained by powder X-ray diffraction measurement according to Comparative Example 3.

DETAILED DESCRIPTION

Figure 1:
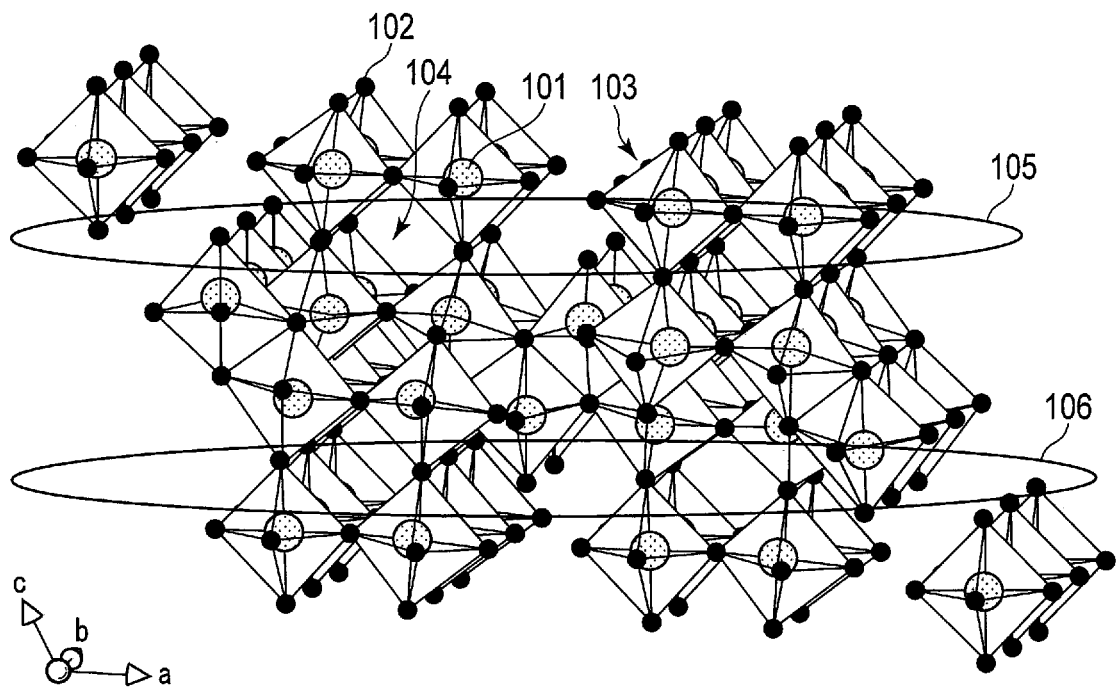
FIG. 1 is a schematic view illustrating a crystal structure of a niobium-titanium composite oxide Nb$_2$TiO$_7$.

According to one embodiment, an active material is provided. The active material includes a primary particle, and the primary particle includes an $Nb_{10}Ti_2O_{29}$ phase and at least one Nb-rich phase selected from the group consisting of an $Nb_{14}TiO_{37}$ phase and an $Nb_{24}TiO_{64}$ phase. In the primary particle, a ratio $M_{Nb}/M_{Ti}$ of a substance amount of niobium to a substance amount of titanium satisfies $5.0 < M_{Nb}/MT \le 24.0$. A diffraction chart according to a wide angle X-ray diffraction method using a CuKα ray as an X-ray source for the active material includes a peak A appearing within a range of 2θ of $24.9 \pm 0.2°$ attributed to the $Nb_{10}Ti_2O_{29}$ phase, a peak B appearing within a range of 2θ of $25.5 \pm 0.2°$ attributed to the Nb-rich phase, and a peak C appearing within a range of 2θ of $23.7 \pm 0.2°$ attributed to the $Nb_{10}Ti_2O_{29}$ phase. The active material satisfies a peak intensity ratio represented by the following formula (1).

$$0 < I_B/I_A < 5.0 \tag{1}$$

In formula (1), $I_A$ is a peak intensity of the peak A, and $I_B$ is a peak intensity of the peak B. A half width of the peak C is in a range of 0.15° or more and 0.80° or less.

According to another embodiment, provided is an electrode including the active material according to the embodiment.

According to another embodiment, provided is a secondary battery including a positive electrode, a negative electrode, and an electrolyte. The negative electrode includes the electrode according to the embodiment.

According to another embodiment, provided is a battery pack including the secondary battery according to the embodiment.

According to another embodiment, provided is a vehicle including the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in an actual device; they can however be appropriately design-changed, taking into account the following explanations and known technology.

FIRST EMBODIMENT

According to a first embodiment, an active material is provided. The active material includes a primary particle, which includes an $Nb_{10}Ti_2O_{29}$ phase and at least one Nb-rich phase selected from the group consisting of an $Nb_{14}TiO_{37}$ phase and an $Nb_{24}TiO_{64}$ phase. In the primary particle, a ratio $M_{Nb}/M_{Ti}$ of a substance amount of niobium to a substance amount of titanium satisfies $5.0 < M_{Nb}/M_{Ti} \le 24.0$. A diffraction chart according to a wide angle X-ray diffraction method using a CuKα ray as an X-ray source for the active material includes: a peak A appearing within a range of 2θ of $24.9 \pm 0.2°$, and which is attributed to the $Nb_{10}Ti_2O_{29}$ phase; a peak B appearing within a range of 2θ of $25.5 \pm 0.2°$, and which is attributed to the Nb-rich phase; and a peak C appearing within a range of 2θ of $23.7 \pm 0.2°$, and which is attributed to the $Nb_{10}Ti_2O_{29}$ phase. The active material satisfies a peak intensity ratio represented by the following formula (1).

$$0 < I_B/I_A < 5.0 \tag{1}$$

In formula (1), $I_A$ is a peak intensity of the peak A, and $I_B$ is a peak intensity of the peak B. A half width of the peak C is within a range of 0.15° or more and 0.80° or less.

The active material according to the embodiment may be an active material for a battery. The active material may be, for example, an electrode active material for use in an electrode of a secondary battery such as a lithium ion battery or a nonaqueous electrolyte battery. The active material may be, for example, a negative electrode active material for use in a negative electrode of a secondary battery.

Figure 2:
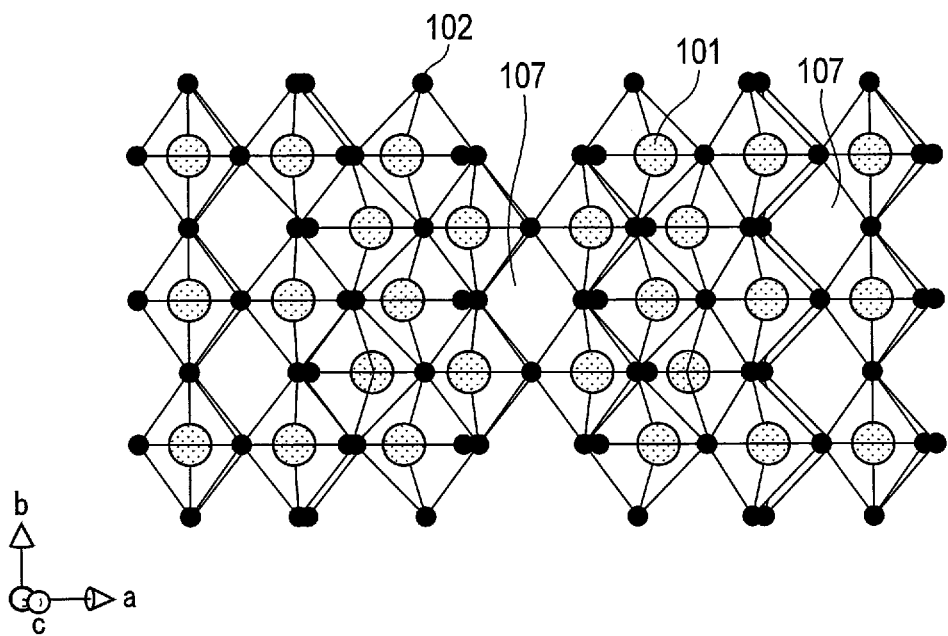
FIG. 2 is a schematic view illustrating the crystal structure of FIG. 1 from another direction.

The $Nb_{10}Ti_2O_{29}$ phase, the $Nb_{14}TiO_{37}$ phase, and the $Nb_{24}TiO_{64}$ phase will be described. Crystal structures of the $Nb_{10}Ti_2O_{29}$ phase, the $Nb_{14}TiO_{37}$ phase, and the $Nb_{24}TiO_{64}$ phase are similar to a crystal structure of a niobium-titanium composite oxide $Nb_2TiO_7$ having a monoclinic crystal structure, which is shown in FIGS. 1 and 2. Here, the crystal structure of the monoclinic $Nb_2TiO_7$ phase will be described with reference to FIGS. 1 and 2.

The monoclinic $Nb_2TiO_7$ phase has a symmetry of a space group C2/m, and may have a crystal structure having atomic coordinates described in the Non-Patent Document Journal of Solid State Chemistry 53, pp 144-147 (1984). Similarly to the $Nb_2TiO_7$ phase, each of the $Nb_{10}Ti_2O_{29}$ phase, the $Nb_{14}TiO_{37}$ phase, and the $Nb_{24}TiO_{64}$ phase may have a symmetry of the space group C2/m and may have a monoclinic crystal structure.

As illustrated in FIG. 1, in the crystal structure of monoclinic $Nb_2TiO_7$, metal ions 101 and oxide ions 102 form skeletal structure portions 103. At positions of the metal ion 101, Nb ions and Ti ions are arbitrarily arranged at a ratio of Nb:Ti=2:1. Such skeletal structure portions 103 are alternately arranged three-dimensionally, whereby vacancies 104 are formed among the skeletal structure portions 103. These vacancies 104 serve as hosts for lithium ions. From 0 moles up to 5.0 moles of lithium ions may be inserted into this crystal structure. Therefore, the composition when 0 to 5.0 moles of lithium ions are inserted can be expressed as $Li_xNb_2TiO_7$ ($0 \le x \le 5$).

In FIG. 1, regions 105 and 106 are sections having two-dimensional channels in [100] and [010] directions. As illustrated in FIG. 2, the crystal structure of monoclinic $Nb_2TiO_7$ has vacancies 107 along a [001] direction. The vacancies 107 have a tunnel structure advantageous in conduction of lithium ions and serves as conductive paths in a [001] direction connecting region 105 and region 106. The conductive paths make migration of lithium ions between regions 105 and 106 possible. Further, the niobium-titanium composite oxide has a lithium insertion potential of about 1.5 V (vs. Li/Li+). Therefore, an electrode including the niobium-titanium composite oxide as the active material can realize a battery that can stably repeat rapid charging and discharging.

Moreover, when lithium ions are inserted into the vacancies 104 in the above crystal structure, metal ions 101 configuring the skeletal frame are reduced to trivalent, whereby the crystal maintains electrical neutrality. In the niobium-titanium composite oxide, not only are Ti ions reduced from tetravalent to trivalent, but Nb ions are reduced from pentavalent to trivalent, as well. Therefore, the number of reduced valences per active material weight is large. Thus, the niobium-titanium composite oxide can maintain electrical neutrality of the crystal even if many lithium ions are inserted. Therefore, energy density is higher in the niobium-titanium composite oxide as compared to that of a compound such as titanium oxide only containing tetravalent cations.

As described above, the $Nb_2TiO_7$ phase has a high energy density and also exhibits excellent input performance. On the other hand, an ion diffusion rate upon extraction of lithium ions from the crystal structure (i.e., output performance) is not sufficient.

In order to improve the output performance deficient in the $Nb_2TiO_7$ phase, the present inventors have adopted the $Nb_{10}Ti_2O_{29}$ phase when using niobium-titanium composite oxide as the active material. In the $Nb_{10}Ti_2O_{29}$ phase, more tunnel structures 107 are included within the structure than that for the $Nb_2TiO_7$ phase, and the crystal structure is stable because of high low-temperature stability; thus, the diffusion rate of lithium ions is superior to that of the $Nb_2TiO_7$ phase Namely, the output performance is improved by adopting the $Nb_{10}Ti_2O_{29}$ phase.

However, the $Nb_{10}Ti_2O_{29}$ phase exhibits large expansion and contraction of a lattice volume in association with insertion and extraction of lithium ions. When the crystal structure expands or contracts, cracks are generated in the crystals, which ultimately causes cracking of a particle itself. When the particle itself is cracked, for example, a specific surface area is increased, and thus cycle life is shortened.

The present inventors have succeeded in not only having the $Nb_{10}Ti_2O_{29}$ phase present but also having the $Nb_{14}TiO_{37}$ phase and/or the $Nb_{24}TiO_{64}$ phase coexist within a primary particle, in order to suppress cracking of the primary particle. The $Nb_{14}TiO_{37}$ phase and/or the $Nb_{24}TiO_{64}$ phase have a larger stoichiometric number of niobium than the $Nb_{10}Ti_2O_{29}$ phase. Herein, a niobium-titanium composite oxide phase for which an Nb/Ti ratio within the crystal phase is greater than 5 will be referred to as "Nb-rich phase". Both the $Nb_{14}TiO_{37}$ phase and the $Nb_{24}TiO_{64}$ phase are a kind of Nb-rich phase. The primary particle according to the embodiment may be one configured only of a mixed phase of the $Nb_{10}Ti_2O_{29}$ phase and the Nb-rich phase.

In the primary particle including the $Nb_{10}Ti_2O_{29}$ phase and the Nb-rich phase, a site that is a weak point of each crystal phase is dispersed within active material particle. Therefore, even if cracks are generated in any one of the crystal structures, cracking of the entire primary particle is unlikely to occur. Therefore, the cycle life performance of the active material including such a primary particle is excellent.

In general, it is known that, when plural species of crystal phases coexist within a primary particle, diffusibility of lithium ions decreases between these crystal phases. However, between the two species of crystal phases included in the primary particle according to the present embodiment, that is, the $Nb_{10}Ti_2O_{29}$ phase and the Nb-rich phase, a decrease in diffusibility of lithium ions can be suppressed for the following reasons.

Here, in order to promote understanding, the $Nb_{24}TiO_{64}$ phase will be described as a representative crystal phase of the Nb-rich phase. Both the $Nb_{10}Ti_2O_{29}$ phase and the $Nb_{24}TiO_{64}$ phase are formed with arranged blocks containing 12 octahedrons ($NbO_6$) each composed of one Nb atom and six oxygen atoms. Each of the blocks is composed of the octahedrons in a 3×4 arrangement. The $Nb_{10}Ti_2O_{29}$ phase has a structure in which a multitude of the blocks alone are arranged three-dimensionally in an ordered manner. On the other hand, the $Nb_{24}TiO_{64}$ phase also has a structure in which a multitude of the plural blocks are arranged three-dimensionally in an ordered manner, but the $Nb_{24}TiO_{64}$ phase has a structure in which tetrahedrons of $NbO_4$ are inserted between these blocks at regular intervals. As described above, both the $Nb_{10}Ti_2O_{29}$ phase and the $Nb_{24}TiO_{64}$ phase are primarily formed by arranging of blocks in which the octahedrons ($NbO_6$) are arranged in a 3×4 arrangement. That is, these crystal phases have similar structures, which include side-sharing and vertex-sharing of the same degree in number as each other, and thus the movement of lithium is hardly inhibited despite of the presence of a crystal boundary, whereby the entire active material particle (primary particle) can be used during charge/discharge.

The $Nb_{14}TiO_{37}$ phase also has a crystal structure similar to that of the $Nb_{24}TiO_{64}$ phase. Therefore, when the $Nb_{10}Ti_2O_{29}$ phase and at least one Nb-rich phase selected from the group consisting of the $Nb_{14}TiO_{37}$ phase and the $Nb_{24}TiO_{64}$ phase coexist in the primary particle, excellent input/output performance can be maintained.

In any niobium-titanium composite oxide composed of the $Nb_{10}Ti_2O_{29}$ phase, the $Nb_{14}TiO_{37}$ phase, or the $Nb_{24}TiO_{64}$ phase having a high niobium content, more side-sharing between the octahedrons composed of $NbO_6$ are present as compared with the $Nb_2TiO_7$ phase having a low niobium content. In the side-sharing, twice the amount of oxygen is bonded to metal ions as compared with vertex-sharing in which the metal ions are bonded to each other by one oxygen. Therefore, bonds are hardly broken during insertion and extraction of lithium, and the crystal structure can be stably maintained during charge/discharge cycles. In addition, when many side-sharing are present, disintegration of the crystal structure during charge/discharge, which is particularly prominent at a high temperature, can also be suppressed. Namely, the niobium-titanium composite oxide having an Nb/Ti ratio of 5 or more is excellent not only in cycle life performance but also in high-temperature durability.

As described above, since the active material (active material powder) according to the embodiment includes the primary particle in which the $Nb_{10}Ti_2O_{29}$ phase and the Nb-rich phase coexist, excellent output performance and cycle life performance can be achieved.

The composition when lithium ions are inserted into the $Nb_{10}Ti_2O_{29}$ phase can be represented as $Li_xNb_{10}Ti_2O_{29}$ (0≤x≤22). The composition when lithium ions are inserted into the $Nb_{14}TiO_{37}$ phase can be represented as $Li_xNb_{14}TiO_{37}$ (0≤x≤29). The composition when lithium ions are inserted into the $Nb_{24}TiO_{64}$ phase can be represented as $Li_xNb_{24}TiO_{64}$ (0≤x≤49).

The active material according to the embodiment includes a primary particle in which a ratio $M_{Nb}/M_{Ti}$ of a substance amount of niobium to a substance amount of titanium satisfies 5.0<$M_{Nb}/M_{Ti}$≤24.0. Herein, "$M_{Nb}$" represents a substance amount of niobium contained in the particle, and "$M_{Ti}$" represents a substance amount of titanium contained in the particles. The ratio $M_{Nb}/M_{Ti}$ may be less than 24.0. When a single primary particle satisfies 5.0<$M_{Nb}/M_{Ti}$≤24.0, it can be determined that the $Nb_{10}Ti_2O_{29}$ phase and at least one Nb-rich phase selected from the group consisting of the $Nb_{14}TiO_{37}$ phase and the $Nb_{24}TiO_{64}$ phase coexist within the primary particle.

Whether or not the active material according to the embodiment includes the primary particle satisfying 5.0<$M_{Nb}/M_{Ti}$≤24.0 can be confirmed by scanning electron microscopy-energy dispersive X-ray spectroscopy (SEM-EDX), described later. According to SEM-EDX, a distribution of the crystal phases in each particle can be examined.

When the ratio $M_{Nb}/M_{Ti}$ in the primary particle is within this range, both the $Nb_{10}Ti_2O_{29}$ phase and the Nb-rich phase can be considered to be present in sufficient amounts within the primary particle. Therefore, even if cracks are generated in at least a part of the primary particle, the primary particle itself hardly becomes cracked. That is, since an increase in specific surface area of the active material can be prevented, excellent cycle life performance can be achieved.

When the ratio $M_{Nb}/M_{Ti}$ in the primary particle is less than 5.0, there is a tendency that the $Nb_{10}Ti_2O_{29}$ phase and the Nb-rich phase are less likely to be present as separate phases within the primary particle. When the primary particle is composed only of a single crystal phase, weak portions of the crystal such as a vertex-sharing portion align along one direction during lithium ion insertion and extraction associated with charge/discharge, and therefore cracking of the particle along that direction is apt to occur. This causes degradation in cycle life.

When the ratio $M_{Nb}/M_{Ti}$ within the primary particle exceeds 24.0, a niobium oxide phase ($Nb_2O_5$) containing no titanium may be formed. The niobium oxide phase is not preferable for being poor in lithium ion conductivity, since the phase therefore adversely affects battery performance.

The ratio $M_{Nb}/M_{Ti}$ preferably satisfies $6.5 \leq M_{Nb}/M_{Ti} \leq 12.0$. The case where the ratio $M_{Nb}/M_{Ti}$ is within this numerical range includes a case where an abundance ratio between the $Nb_{10}Ti_2O_{29}$ phase and the Nb-rich phase in the primary particle is 1:1. Specifically, the abundance ratio between the $Nb_{10}Ti_2O_{29}$ phase and the $Nb_{24}TiO_{64}$ phase is 1:1 when the ratio $M_{Nb}/M_{Ti}$ is 14.5, and the abundance ratio between the $Nb_{10}Ti_2O_{29}$ phase and the $Nb_{14}TiO_{37}$ phase is 1:1 when the ratio $M_{Nb}/M_{Ti}$ is 9.5. When the abundance ratio between the $Nb_{10}Ti_2O_{29}$ phase and the Nb-rich phase in the primary particle is 1:1 or a ratio close thereto, the respective crystal phases tend to be separated uniformly. Therefore, an effect of easily suppressing cracking of the particle is obtained. That is, excellent cycle life performance can be achieved.

It is preferable that each primary particle included in the active material in the embodiment has a composition having an Nb/Ti ratio close to an Nb/Ti ratio as a whole. The Nb/Ti ratio as a whole is an abundance ratio between Nb atoms and Ti atoms that can be calculated from the peak intensity ratio $I_B/I_A$ which can be measured by powder X-ray diffraction measurement, described later. The ratios $M_{Nb}/M_{Ti}$ of each of the primary particles may be different from one another or may be the same. The active material (active material powder) according to the embodiment may further include a primary particle composed solely of the $Nb_{10}Ti_2O_{29}$ phase and/or a primary particle composed solely of the Nb-rich phase in addition to the primary particles in which the $Nb_{10}Ti_2O_{29}$ phase and the Nb-rich phase are mixed.

Further, the active material according to the embodiment satisfies a first peak intensity ratio represented by the following formula (1).

$$0 < I_B/I_A < 5.0 \quad (1)$$

In Formula (1), $I_A$ is a peak intensity of a peak which appears within a range of 2θ of 24.9±0.2° within a diffraction chart according to a wide angle X-ray diffraction method using a CuKα ray as an X-ray source, and is attributed to the $Nb_{10}Ti_2O_{29}$ phase. $I_B$ is a peak intensity of a peak which appears within a range of 2θ of 25.5±0.2° in the diffraction chart, and is attributed to the Nb-rich phase. A method for implementing the wide angle X-ray diffraction method will be described later.

The peak intensity $I_A$ is a peak intensity (peak height) of the peak A attributed to the $Nb_{10}Ti_2O_{29}$ phase. The peak A is a peak having a maximum peak intensity within the range of 2θ of 24.9±0.2°. A large peak intensity $I_A$ means that a weight accounted for by the $Nb_{10}Ti_2O_{29}$ phase within the entire active material is large.

The peak intensity $I_B$ is a peak intensity (peak height) of the peak B attributed to at least one Nb-rich phase selected from the group consisting of the $Nb_{14}TiO_{37}$ phase and the $Nb_{24}TiO_{64}$ phase. The peak B is a peak having a maximum peak intensity within the range of 2θ of 25.5±0.2°. A large peak intensity $I_B$ means that a weight accounted for by the Nb-rich phase in the entire active material is large.

As described above, with the active material containing the Nb-rich phase in addition to the $Nb_{10}Ti_2O_{29}$ phase (the peak intensity ratio $I_B/I_A$ is more than 0), the cycle life performance is improved. However, even when the Nb-rich phase is indefinitely increased, the cycle life performance is not improved by the increased amount. This is because, when the peak intensity ratio $I_B/I_A$ is excessively large, a portion occupied by the Nb-rich phase within the active material particle becomes large, whereby portions having weak strength are aligned among plural crystal lattices, and the particle is easily cracked. In order to avoid this, the peak intensity ratio ($I_B/I_A$) is 5.0 or less.

The peak intensity ratio $I_B/I_A$ is preferably 0.01 or more and 1.20 or less, and more preferably 0.01 or more and 0.80 or less. When the peak intensity ratio $I_B/I_A$ is 1.20 or less, the generation of the niobium oxide phase tends to be sufficiently suppressed. Therefore, when the peak intensity ratio satisfies the above range, both the output performance and the cycle life performance are excellent. The peak intensity ratio $I_B/I_A$ may be in a range of 0.10 or more and 0.80 or less, or in a range of 0.30 or more and 0.80 or less.

Further, the diffraction chart according to a wide angle X-ray diffraction method using a CuKα ray as an X-ray source for the active material according to the embodiment has a peak C appearing within a range of 2θ of 23.7±0.2°, which is attributed to the $Nb_{10}Ti_2O_{29}$ phase. A half width of the peak C is within a range of 0.15° or more and 0.80° or less.

The half width of the peak C is a half width of the peak attributed to the $Nb_{10}Ti_2O_{29}$ phase. The half width is a width of a peak at half the maximum intensity. The peak intensity of the peak C is also referred to as peak intensity $I_C$.

A half width of the peak C being 0.15° or more means that the crystals of the $Nb_{10}Ti_2O_{29}$ phase are sufficiently small. Since the crystals of the $Nb_{10}Ti_2O_{29}$ phase are dispersed in a small state within the active material particle, cracking of the particle is suppressed. If the half width of the peak C is less than 0.15°, that is, if the peak C is sharp, the crystals are too large and induce cracking of the particle, which is not preferable. On the other hand, if the half width of the peak C exceeds 0.80°, there is a possibility that the crystals are too small, whereby the arrangement of the crystals is disturbed, thereby inhibiting the movement of lithium ions. The half width of the peak C is more preferably within a range of 0.20° or more and 0.45° or less.

As described above, the active material according to the embodiment includes a primary particle including an $Nb_{10}Ti_2O_{29}$ phase and at least one Nb-rich phase selected from the group consisting of an $Nb_{14}TiO_{37}$ phase and an $Nb_{24}TiO_{64}$ phase, and a ratio $M_{Nb}/M_{Ti}$ of a substance amount of niobium to a substance amount of titanium satisfies $5.0 < M_{Nb}/M_{Ti} \leq 24.0$. Further, according to X-ray diffraction for the active material, the peak intensity ratio $I_B/I_A$ is within a range of more than 0 and less than 5.0. Moreover, the half width of the peak C attributed to the $Nb_{10}Ti_2O_{29}$ phase is within a range of 0.15° or more and 0.80° or less. Therefore, the active material can realize a secondary battery capable of exhibiting excellent output performance and cycle life performance.

The active material according to the embodiment preferably further satisfies a second peak intensity ratio represented by the following formula (2).

$$0 \leq I_D/I_A < 0.01 \quad (2)$$

In Formula (2), $I_A$ is a peak intensity of the peak A appearing within a range of 2θ of 24.9±0.2° in a diffraction chart according to a wide angle X-ray diffraction method using a CuKα ray as an X-ray source, which is attributed to the $Nb_{10}Ti_2O_{29}$ phase. $I_D$ is a peak intensity of a peak D appearing within a range of 2θ of 20.1±0.2° in the diffraction chart, which is attributed to the $Nb_2TiO_7$ phase.

The peak intensity $I_A$ is a peak intensity (peak height) of the peak A attributed to the $Nb_{10}Ti_2O_{29}$ phase, as described above.

The peak intensity $I_D$ is a peak intensity (peak height) of the peak D attributed to the $Nb_2TiO_7$ phase. The peak D is a peak having a maximum peak intensity within the range of 2θ of 20.1±0.2°. A large peak intensity $I_D$ means that a weight accounted for by the $Nb_2TiO_7$ phase in the entire active material is large.

As described above, in the $Nb_{10}Ti_2O_{29}$ phase, the $Nb_{14}TiO_{37}$ phase, and the $Nb_{24}TiO_{64}$ phase, many side-sharing by the octahedrons composed of $NbO_6$ are present in the crystal structures configuring the phases. Therefore, the active material according to the embodiment exhibits excellent cycle life performance. On the other hand, since the $Nb_2TiO_7$ phase has little side-sharing, bonds are easily broken during insertion and extraction of lithium ions. Therefore, the active material according to the embodiment preferably does not include the $Nb_2TiO_7$ phase. Specifically, as described above, when the active material satisfies Formula (2), the active material contains little or no $Nb_2TiO_7$ phase. As is clear from the above formula (2), the diffraction chart may not necessarily have the peak D. The diffraction chart preferably does not have the peak D.

The active material according to the embodiment may contain one or more additive elements selected from the group consisting of Ta, K, and P. A total amount of the additive elements contained in the active material is preferably 5000 ppm or less in terms of molar ratio relative to the niobium-titanium composite oxide. A more preferable addition amount is within a range of 200 ppm or more and 3000 ppm or less. When the active material contains Ta, the stability of the crystals can be enhanced. When the active material contains at least one selected from the group consisting of K and P, the melting point can be lowered to enhance crystallinity.

Whether or not the additive element is contained in the active material can be confirmed by inductively coupled plasma atomic emission spectroscopy (ICP analysis).

First, an active material in a state in which Li is completely extracted is prepared by procedures described later for the powder X-ray diffraction method. This active material is subjected to vacuum drying at a temperature of 140° C. for 24 hours. Next, a total weight of the active material is measured in a dry atmosphere. This active material is dissolved in an acid and subjected to inductively coupled plasma atomic emission spectroscopy (ICP) analysis. The species and concentration of the additive element(s) contained in the active material can be measured by ICP.

Next, the form, particle size, and specific surface area of the active material according to the embodiment will be described.

<Form>

The form of the active material (niobium-titanium composite oxide) according to the embodiment is not particularly limited. The niobium-titanium composite oxide may take the form of, for example, primary particles, and also may take the form of secondary particles obtained by agglomeration of primary particles. The niobium-titanium composite oxide may be a mixture of primary particles and secondary particles. Primary particles containing the $Nb_{10}Ti_2O_{29}$ phase and the Nb-rich phase may constitute the niobium-titanium composite oxide.

The particles of the niobium-titanium composite oxide may have a carbon-containing layer on a surface thereof. The carbon-containing layer may be attached to the surface of primary particles or may be attached to the surface of secondary particles. Alternatively, the particles of the niobium-titanium composite oxide may include secondary particles formed by agglomeration of primary particles having a carbon-containing layer attached on surfaces thereof. Such secondary particles can exhibit excellent electrical conductivity since carbon exists among the primary particles. A mode including such secondary particles is preferable since the active material-containing layer can exhibit a lower resistance.

<Particle Size>

An average particle size of the active material particles which are primary particles or secondary particles of the niobium-titanium composite oxide is not particularly limited. The average particle size of the active material particles is, for example, in a range of 0.1 μm to 50 μm. The average particle size may be chosen depending on the required battery performance. For example, in order to enhance rapid charge/discharge performance, the average particle size is preferably 1.0 μm or less. By setting the average particle size within this range, a diffusion distance of lithium ions within the crystals can be shortened, and thus, the rapid charge/discharge performance can be improved. The average particle size can be determined by, for example, a laser diffraction methods.

<BET Specific Surface Area>

A BET (Brunauer, Emmett, Teller) specific surface area of the active material according to the embodiment is not particularly limited. However, the BET specific surface area is preferably 5 $m^2/g$ or more and less than 200 $m^2/g$.

When the specific surface area is 5 $m^2/g$ or more, contact area with an electrolyte can be secured, whereby good discharge rate performance can be easily obtained, and the charging time can also be shortened. On the other hand, when the specific surface area is less than 200 $m^2/g$, the reactivity with the electrolyte does not become too high, and life performance can be improved. Further, coatability of a slurry containing the active material for use in the later-described production of an electrode can be improved.

Here, the specific surface area is measured by a method in which molecules for which an adsorption occupancy area is known is adsorbed onto surfaces of powder particles at a temperature of liquid nitrogen, and the specific surface area of the sample is determined from the amount of the molecules. The BET method utilizing low-temperature and low-humidity physical adsorption of an inert gas is most often used, and is based on BET theory, the most famous theory as a method for calculating the specific surface area, which is an extension of the Langmuir theory, a monolayer adsorption theory, to multilayer adsorption. The thus obtained specific surface area is referred to as BET specific surface area.

<Manufacturing Method>

The active material according to the embodiment can be produced by a first synthesis method or a second synthesis method, which will be described below. Both the first synthesis method and the second synthesis method are solid phase synthesis methods.

(First Synthesis Method)

The first synthesis method is a method in which primary particles with a sole phase of the $Nb_{10}Ti_2O_{29}$ phase, and primary particles with a sole phase of the $Nb_{14}TiO_{37}$ phase and/or primary particles with a sole phase of the $Nb_{24}TiO_{64}$ phase are produced, and the particles are appropriately mixed and ground, and then calcined at a low temperature.

The respective particles are mixed at a weight ratio such that a total Nb/Ti ratio (molar ratio) is in a range of more than 5.0 and 24.0 or less. When the Nb/Ti ratio at the time of mixing is 5.0 or less, a solid solution is generated. In other words, no phase separation between the $Nb_{10}Ti_2O_{29}$ phase and the Nb-rich phase occurs within the primary particles. In this case, since the peak B does not appear, $I_B/I_A$ is 0.

The primary particle with a sole phase of each crystal phase can be synthesized as follows. First, $Nb_2O_5$ particles and $TiO_2$ particles as starting materials are mixed at a ratio of Nb/Ti contained in a target phase. This mixture is mixed in a ball mill for 1 hour to 10 hours, and then fired at a temperature of 900° C. to 1400° C. for 1 hour to 12 hours, whereby target active material particles composed solely of a target crystal phase can be obtained.

After producing primary particles with a sole phase of the $Nb_{10}Ti_2O_{29}$ phase, primary particles with a sole phase of the $Nb_{14}TiO_{37}$ phase, and/or primary particles with a sole phase of the $Nb_{24}TiO_{64}$ phase, the primary particles are mixed at a weight ratio such that the total Nb/Ti ratio is within the range of more than 5.0 and 24.0 or less, as described above. Then, the obtained mixture is sufficiently ground and mixed, and then fired at a temperature of 700° C. to 1000° C. for 15 minutes to 2 hours. Thereby, the active material according to the embodiment can be prepared.

(Second Synthesis Method)

The second synthesis method is a method in which a titanium source and a niobium source are mixed as starting materials so that the molar ratio Nb/Ti of niobium to titanium is more than 5.0 and 24.0 or less, and then the mixture is fired.

First, $Nb_2O_5$ particles and $TiO_2$ particles as starting materials are mixed. At this time, mixing is performed so that the molar ratio between the starting materials is a desired Nb/Ti ratio, for example, $Nb_2O_5:TiO_2=2.5$ to 12.0:1. This is because, when the molar ratio between the starting materials is within this range, the Nb-rich phase is stably formed.

In order to make the finally obtained active material particles (primary particles) less likely to crack, it is advantageous for the same crystals among each of the crystals composing the primary particles to not be arranged adjacent to each other, as described above. In order to prepare such primary particles, microcrystals composing each crystal phase should not be localized and need to be dispersed within the particles. That is, the raw material particles are preferably ground so as to have an average particle size of a certain value or less. The half width of the peak C tends to increase by making the raw material particles be microcrystals.

Specifically, when $Nb_2O_5$ particles are used as the niobium source, the average particle size of the $Nb_2O_5$ particles is preferably adjusted to be within a range of 0.05 μm to 0.6 μm. When $TiO_2$ particles are used as the titanium source, the average particle size of the $TiO_2$ particles is preferably adjusted to be within a range of 0.01 μm to 0.4 μm. Here, the average particle size indicates a particle size (D50) at a volume frequency of 50%. D50 can be measured by a laser diffraction scattering type particle size distribution measuring apparatus. By making the raw material particles fine, the $Nb_{10}Ti_2O_{29}$ phase and the Nb-rich phase are likely to be in a sufficiently dispersed state within the primary particles generated by the solid phase reaction.

In order to suppress appearance of the $Nb_2TiO_7$ phase containing a large amount of titanium, the average particle size of the $TiO_2$ particles is preferably made smaller than the average particle size of the $Nb_2O_5$ particles.

Next, upon synthesizing the active material by the solid phase method, first, a mixture of raw materials is mixed in a ball mill for 1 hour to 10 hours. Thereafter, pre-firing (first firing) is performed before main firing. The main firing is desirably performed at a temperature of 600° C. to 1100° C. for 1 hour to 12 hours. By performing the pre-firing, trace amounts of impurity components (for example, water, organic substances, and the like) adsorbed onto the raw material powder can be removed. The pre-firing may be omitted.

The main firing (second firing) is preferably performed at a temperature of 900° C. to 1200° C. for 1 hour to 10 hours. The main firing is more preferably performed at a temperature of 950° C. to 1050° C. for 2.5 hours to 3.5 hours. By suppressing the reaction between Nb and Ti by setting the firing temperature to the range of 900 to 1200° C., a mixed-phase active material particle satisfying the peak intensity ratio represented by the following formula (1) can be produced.

$$0 < I_B/I_A < 5.0 \tag{1}$$

In formula (1), $I_A$ is a peak intensity of a peak which appears within a range of 2θ of 24.9±0.2° and is attributed to the $Nb_{10}Ti_2O_{29}$ phase, in a diffraction chart obtained by a wide angle X-ray diffraction method using a CuKα ray as an X-ray source. $I_B$ is a peak intensity of a peak which appears within a range of 2θ of 25.5±0.2° and is attributed to the Nb-rich phase, in the diffraction chart.

When the raw materials are mixed, an oxide containing at least one selected from the group consisting of Si, Na, K, and P may be added together. These elements have an effect of improving joining between the crystal phases dispersed within the active material particles and promoting lithium conduction.

When the main firing is performed at a temperature lower than 900° C., the reaction between Nb and Ti hardly proceeds, whereby the raw material oxide remains, and the $Nb_2TiO_7$ phase having a low niobium content may be included. In addition, when the main firing is performed at a temperature exceeding 1200° C., diffusion of the Nb element and the Ti element proceeds quickly, so that a material having a homogeneous composition is likely to be formed, and it becomes difficult to form a mixed phase of the $Nb_{10}Ti_2O_{29}$ phase and the Nb-rich phase within the primary particles.

Annealing treatment may be performed after the main firing. A temperature of the annealing treatment is desirably 350° C. or higher and 800° C. or lower. The annealing treatment performed in this temperature range can mitigate strain within the crystal and stabilize interpenetrating portions of crystal lattices between different crystal phases.

<Powder X-Ray Diffraction Measurement of Active Material and Calculation of Peak Intensity Ratio $I_B/I_A$>

The powder X-ray diffraction measurement of the active material according to the embodiment can be performed, for example, as follows.

First, the target sample is ground until an average particle size reaches about 5 μm. The ground sample is loaded into a holder part of a depth of 0.2 mm formed on a glass sample plate. At this time, care should be taken to fill the holder part sufficiently with the sample. In addition, precaution should be taken to load an amount of the sample that is neither excessive nor insufficient such that cracks, voids, and the like do not occur. Next, another glass plate is pressed from outside to flatten a surface of the sample filled into the holder part. Precaution should be taken not to cause recesses or protrusions with respect of a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is significantly high in this manner is measured using a glass capillary. Specifically, the sample is inserted into a capillary, and this capillary is placed on a rotary sample stage and measured. By such a measuring method, the orientation can be alleviated. A capillary formed of Lindeman glass having a diameter of 1 mm to 6 mm φ is preferably used as the glass capillary.

When the powder X-ray diffraction measurement is performed on the active material contained in an electrode, the measurement is performed, for example, as follows.

First, a state in which lithium ions are completely extracted from the active material is achieved, in order to comprehend the crystal structure of the active material. For example, when the active material is used in the negative electrode, the battery is put into a completely-discharged state. For example, the discharged state of the battery can be achieved by repeating several times a discharging of the battery in a 25° C. environment at 0.1 C current to a rated end voltage or to a battery voltage of 1.0 V, making the current value during discharge be $1/100$ or lower than the rated capacity. There is a case where a lithium ion remains even in the discharged state.

Next, the battery is disassembled in a glove box filled with argon, and the electrode is taken out and washed with an appropriate solvent. As an appropriate solvent, for example, ethyl methyl carbonate may be used. If the washing of the electrode is insufficient, an impurity phase such as lithium carbonate and lithium fluoride may be mixed in due to the influence of the lithium ion remaining in the electrode. In such a case, it is preferable to use an airtight container within which measurement can be implemented in an inert gas. The washed electrode is cut so as to have the area approximately be equal to the area of the holder of the powder X-ray diffractometer to obtain the measurement sample. The sample is directly attached to the glass holder to perform the measurement.

At this time, peaks derived from a metal foil serving as a current collector, an electro-conductive agent, a binder, and the like are measured and grasped in advance using XRD. It is a matter of course that this operation can be omitted if such peaks have been grasped in advance. When the peak of the current collector and the peak of the active material overlap with each other, it is desirable to perform the measurement after dislodging the active material-containing layer off from the current collector. This is in order to separate the overlapping peaks when quantitatively measuring the peak intensity. Although the active material-containing layer may be physically dislodged, the layer can be easily removed by applying ultrasonic waves in a solvent. When ultrasonic treatment is performed to dislodge the active material-containing layer from the current collector, an electrode body powder (including the active material, electro-conductive agent, and binder) can be collected by evaporating off the solvent. The powder X-ray diffraction measurement of the active material can be performed by filling for example, a Lindemann glass capillary or the like with the collected electrode body powder and performing the measurement. The electrode body powder collected by the ultrasonic treatment can also be subjected to various analysis other than the powder X-ray diffraction measurement.

As an apparatus for powder X-ray diffraction measurement, SmartLab manufactured by Rigaku Corporation, for example, is used. The measurement conditions are as follows:

X-ray source: Cu target
Output: 45 kV 200 mA
Soller slit: 5° for both incident and received light
Step width (2θ): 0.01 deg
Scan rate: 2 deg/min
Semiconductor detector: D/teX Ultra 250
Sample plate holder: flat glass sample plate holder (thickness: 0.5 mm)
Measurement range: $5° \leq 2\theta \leq 90°$ When any other apparatus is used, measurement is performed using standard Si powder for powder X-ray diffraction to find conditions under which measurement results of the peak intensity, the half width, and the diffraction angle equivalent to the results obtained using the above-described apparatus can be obtained, and samples are measured under such conditions.

In the obtained diffraction chart, the peak intensity $I_A$ of the peak A having the maximum peak intensity within the range of 2θ of 24.9±0.2° and assigned to the $Nb_{10}Ti_2O_{29}$ phase is determined. In the diffraction chart, the peak intensity $I_B$ of the peak B having the maximum peak intensity within the range of 2θ of 25.5±0.2° and assigned to at least one Nb-rich phase selected from the group consisting of the $Nb_{14}TiO_{37}$ phase and the $Nb_{24}TiO_{64}$ phase is also determined. Then, the peak intensity ratio $I_B/I_A$ is calculated.

<Measurement of $M_{Nb}/M_{Ti}$ by Scanning Electron Microscopy-Energy Dispersive X-Ray Spectroscopy>

According to observation by scanning electron microscopy-energy dispersive X-ray spectroscopy (SEM-EDX), for example, the ratio of $M_{Nb}/M_{Ti}$ contained in the primary particles of the active material can be measured.

The measurement of the $M_{Nb}/M_{Ti}$ ratio by SEM-EDX can be performed, for example, as follows. First, a target sample is ground until the average particle size reaches about 5 μm. The ground sample is fixed onto a sample stage using a carbon tape or the like. At this time, as the equipment for fixing and the sample stage, those not containing niobium or titanium are used.

Next, the sample stage is introduced into a scanning electron microscope (SEM), and measurement is performed under vacuum. In the measurement, the average $M_{Nb}/M_{Ti}$ ratio for the active material particles can be measured by designating the entirety of the active material particles as a measurement range. Alternatively, by making the measurement range narrower, the $M_{Nb}/M_{Ti}$ ratio of the active material particles in the measurement range can be measured.

An acceleration voltage for the measurement is desirably set to at least 5 kV or more in order to appropriately evaluate the $M_{Nb}/M_{Ti}$ ratio of a bulk sample, and can be measured at, for example, 15 kV.

When the SEM-EDX is performed on the active material contained in an electrode, for example, the SEM-EDX can be performed as follows. First, in a similar manner as that described for the powder X-ray diffraction measurement, a washed electrode is prepared. This electrode is attached onto a SEM sample stage to obtain a measurement sample.

At this time, in order to measure the active material particles, the shapes of an electro-conductive agent, a binder, and the like are measured and grasped in advance using SEM. Of course, this operation can be omitted if these can be grasped in advance. Comparing titanium and niobium against portions not including these elements by using the mapping function of energy-dispersive X-ray spectroscopy is effective. The measurement is preferably performed only for the active material particles, but the measurement can be performed even when an electro-conductive agent and binder are attached in small amounts onto the particles, as the measured $M_{Nb}/M_{Ti}$ ratio is not greatly affected.

According to a first embodiment, an active material is provided. The active material includes a primary particle containing an $Nb_{10}Ti_2O_{29}$ phase and at least one Nb-rich phase selected from the group consisting of an $Nb_{14}TiO_{37}$ phase and an $Nb_{24}TiO_{64}$ phase. In the primary particle, a ratio $M_{Nb}/M_{Ti}$ of a substance amount of niobium to a substance amount of titanium satisfies $5.0 < _M Nb/M_{Ti} \leq 24.0$. A diffraction chart according to a wide angle X-ray diffraction method using a CuKα ray as an X-ray source for the active material has: a peak A which appears within a range of 2θ of 24.9±0.2° and is attributed to the $Nb_{10}Ti_2O_{29}$ phase, a peak B which appears within a range of 2θ of 25.5±0.2° and is attributed to the Nb-rich phase, and a peak C which appears within a range of 2θ of 23.7±0.2° and is attributed to the $Nb_{10}Ti_2O_{29}$ phase. The active material satisfies a peak intensity ratio represented by the following formula (1).

$$0 < I_B/I_A < 5.0 \quad (1)$$

In formula (1), $I_A$ is a peak intensity of the peak A, and $I_B$ is a peak intensity of the peak B. A half width of the peak C is in a range of 0.15° or more and 0.80° or less.

The active material can realize a secondary battery capable of exhibiting excellent output performance and cycle life performance.

SECOND EMBODIMENT

According to a second embodiment, an electrode is provided.

The electrode according to the second embodiment contains the active material according to the first embodiment. This electrode may be a battery electrode containing the active material according to the first embodiment as a battery active material. The electrode as the battery electrode may be, for example, a negative electrode containing the active material according to the first embodiment as a negative electrode active material.

The electrode according to the second embodiment may include a current collector and an active material-containing layer. The active material-containing layer may be formed on one face or both of reverse faces of the current collector. The active material-containing layer may contain the active material, and, optionally, an electro-conductive agent and a binder.

The active material-containing layer may contain the active material according to the first embodiment alone, or may contain two or more kinds of the active materials according to the first embodiment. Furthermore, the active material-containing layer may contain a mixture obtained by mixing one kind or two or more kinds of the active materials according to the first embodiment with one species or two or more species of other active materials. The active material according to the first embodiment may be a niobium-titanium composite oxide.

For example, when the active material according to the first embodiment is contained as the negative electrode active material, examples of such other active materials include lithium titanate having a ramsdellite structure (e.g., $Li_{2+y}Ti_3O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2$), anatase titanium dioxide, rutile titanium dioxide, hollandite titanium composite oxide, and orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 < \sigma \leq 0.5$. Specific examples of the orthorhombic titanium-containing composite oxide include $Li_{2+a}Na_2Ti_6O_{14}$ ($0 \leq a \leq 6$).

The electro-conductive agent is added to improve current collection performance and to suppress the contact resistance between the active material and the current collector. Examples of the electro-conductive agent include carbonaceous substances such as vapor grown carbon fiber (VGCF) carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, whereby excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. Li/Li$^+$) at which lithium (Li) is inserted into and extracted from the active material. For example in the case where the active material is used as a negative electrode active material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets onto the current collector.

The electrode according to the second embodiment includes the active material according to the first embodiment. Therefore, the electrode can realize a secondary battery that can exhibit excellent output performance and cycle life performance.

THIRD EMBODIMENT

According to a third embodiment, there is provided a secondary battery including a negative electrode, a positive electrode, and an electrolyte. The secondary battery includes the electrode according to the second embodiment as the negative electrode. That is, the secondary battery according to the third embodiment includes, as the negative electrode, the electrode containing the active material according to the first embodiment as an active material for a battery.

The secondary battery according to the third embodiment may further include a separator provided between the positive electrode and the negative electrode. The negative electrode, the positive electrode, and the separator may configure an electrode group. The electrolyte may be held in the electrode group.

The secondary battery according to the third embodiment may further include a container member that houses the electrode group and the electrolyte.

Moreover, the secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, portions overlapping the details described in the second embodiment are omitted.

The density of the negative electrode active material-containing layer (excluding the current collector) is preferably from 1.8 g/cm$^3$ to 3.5 g/cm$^3$. The negative electrode, in which the density of the negative electrode active material-containing layer is within this range, is excellent in energy density and ability to hold the electrolyte. The density of the negative electrode active material-containing layer is more preferably from 2.5 g/cm$^3$ to 2.9 g/cm$^3$.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one compound as the positive electrode active material, or include two or more compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When an ambient temperature molten salt is used as the electrolyte of the battery, it is preferable to use a positive electrode active material including lithium iron phosphate, $Li_xVPO_4F$ ($0 \leq x \leq 1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle size of the positive electrode active material is preferably from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be exhibited. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$), and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ambient temperature molten salt (ionic melt) including lithium ions, a polymer solid electrolyte, an inorganic solid electrolyte, or the like may be used as the nonaqueous electrolyte.

The ambient temperature molten salt (ionic melt) indicates compounds among organic salts made of combinations of organic cations and anions, which are able to exist in a liquid state at room temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator is formed of, for example, a porous film or a synthetic resin nonwoven fabric including polyethylene (PE), polypropylene (PP), cellulose, or polyvinylidene fluoride (PVdF). From the viewpoint of safety, a porous film formed from polyethylene or polypropylene is preferably used. This is because these porous films melts at a predetermined temperature and thereby cuts off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), prismatic, cylindrical, coin-shaped, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3.0 V to 5.0 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

Figure 3:
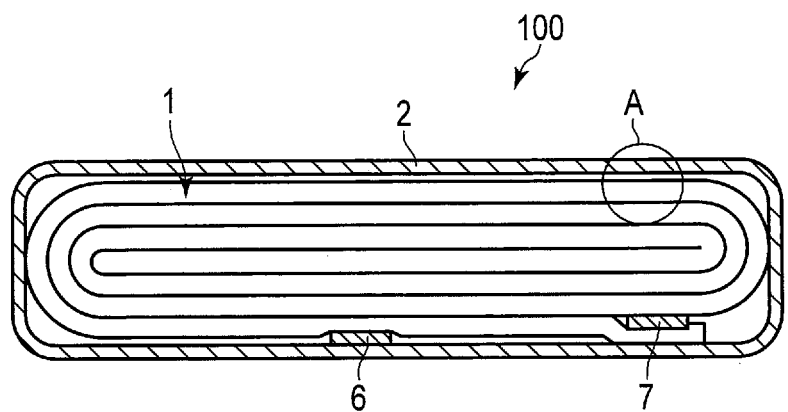
FIG. 3 is a cross-sectional view schematically illustrating an example of a secondary battery according to an embodiment.
Figure 4:
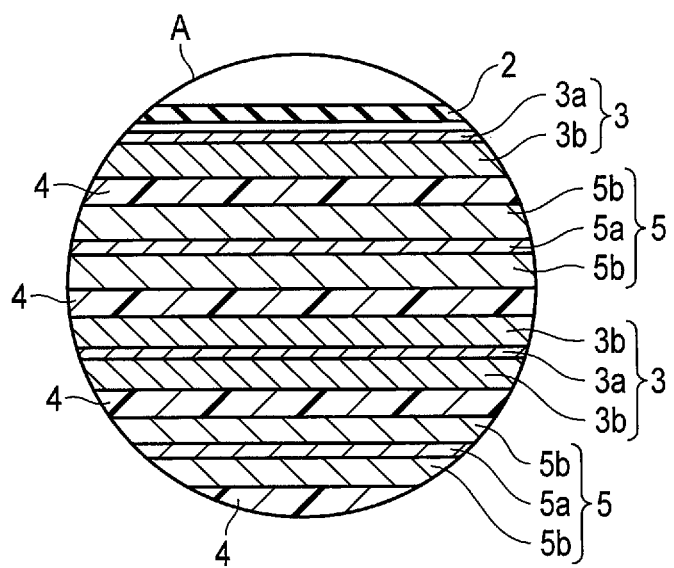
FIG. 4 is an enlarged cross-sectional view of section A of the secondary battery illustrated in FIG. 3.

FIG. 3 is a cross-sectional view schematically showing an example of a secondary battery according to the third embodiment. FIG. 4 is an enlarged cross-sectional view of section A of the secondary battery shown in FIG. 3.

The secondary battery 100 shown in FIGS. 3 and 4 includes a bag-shaped container member 2 shown in FIGS. 3 and 4, an electrode group 1 shown in FIG. 3, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and negative electrode active material-containing layers 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer periphery of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 5:
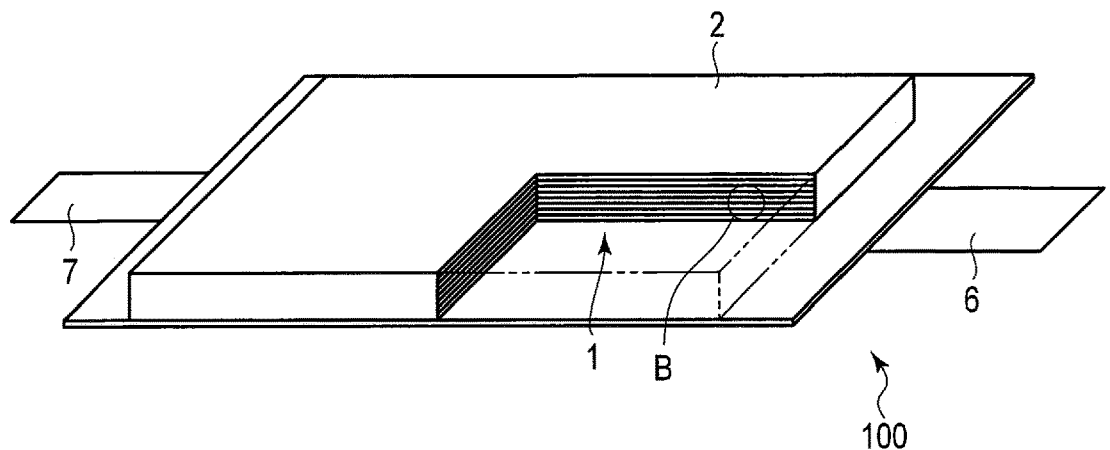
FIG. 5 is a partially cut-out perspective view schematically illustrating another example of the secondary battery according to the embodiment.
Figure 6:
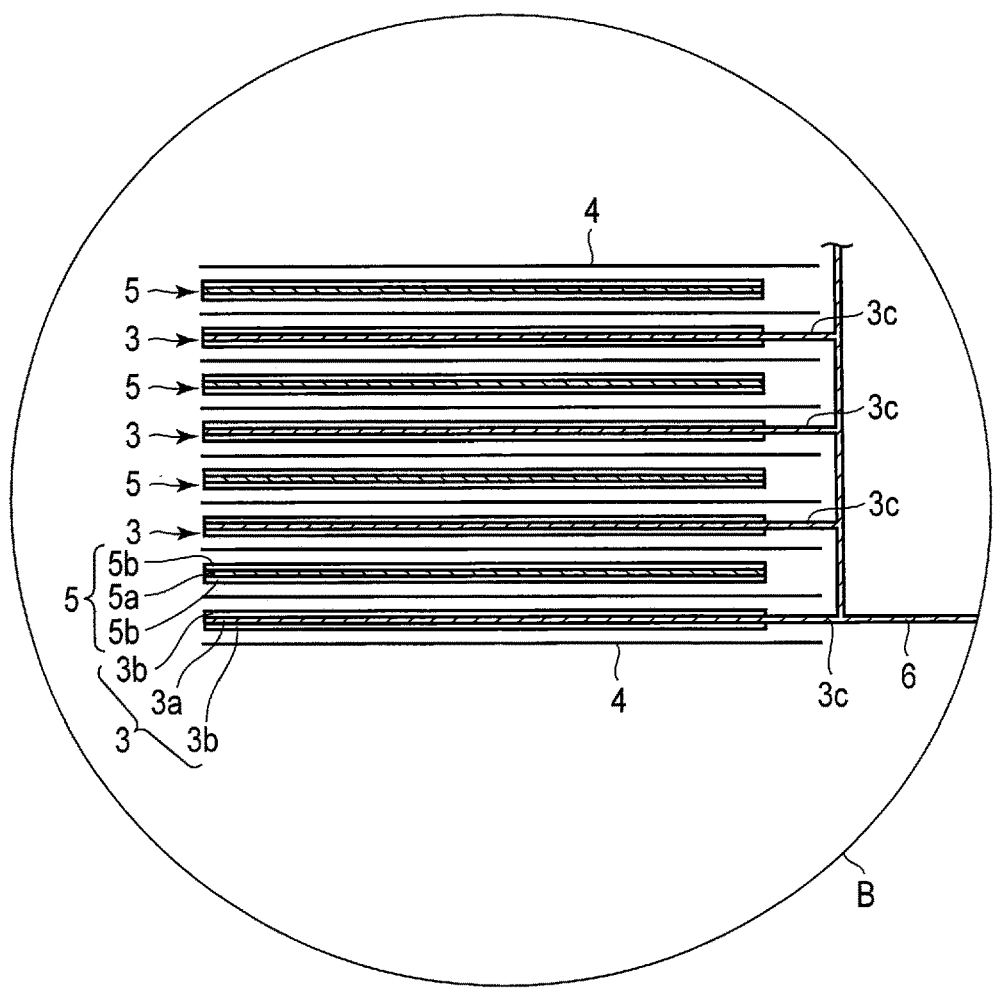
FIG. 6 is an enlarged cross-sectional view of section B of the secondary battery illustrated in FIG. 4.

The secondary battery according to the third embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the third embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 6, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn outside the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn outside the container member 2.

The secondary battery according to the third embodiment contains the active material according to the first embodiment as the negative electrode active material. Therefore, this secondary battery can exhibit excellent output performance and cycle life performance.

FOURTH EMBODIMENT

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

Figure 7:
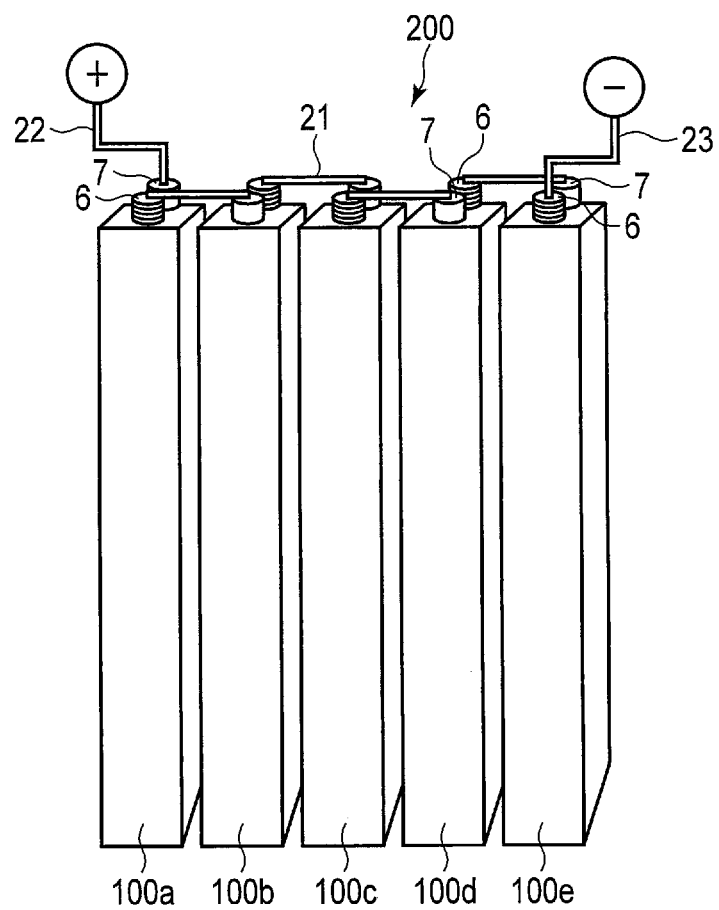
FIG. 7 is a perspective view schematically illustrating an example of a battery module according to an embodiment.

FIG. 7 is a perspective view schematically showing an example of the battery module according to the fourth embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the third embodiment.

A bus bar 21 connects, for example, a negative electrode terminal 6 of one single-battery 100a and a positive electrode terminal 7 of an adjacent single-battery 100b. In this way, five single-batteries 100 are connected in series by four bus bars 21. That is, a battery module 200 of FIG. 7 is a battery module configured of five single-batteries in series.

As shown in FIG. 7, among the five single-batteries 100a to 100e, the positive electrode terminal 7 of the single-battery 100a located at a left end is connected to a positive electrode-side lead 22 for external connection. Among the five single-batteries 100a to 100e, the negative electrode terminal 6 of the single-battery 100e located at a right end is connected to a negative electrode-side lead 23 for external connection.

A battery module according to a fourth embodiment includes the secondary battery according to the third embodiment. Therefore, this battery module can exhibit excellent output performance and cycle life performance.

FIFTH EMBODIMENT

According to the fifth embodiment, a battery pack is provided. The battery pack includes the battery module according to the fourth embodiment. The battery pack may also be provided with a single secondary battery according to the third embodiment instead of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided into the battery pack via the external power distribution terminal.

Next, an example of a battery pack according to the fifth embodiment will be described with reference to the drawings.

Figure 9:
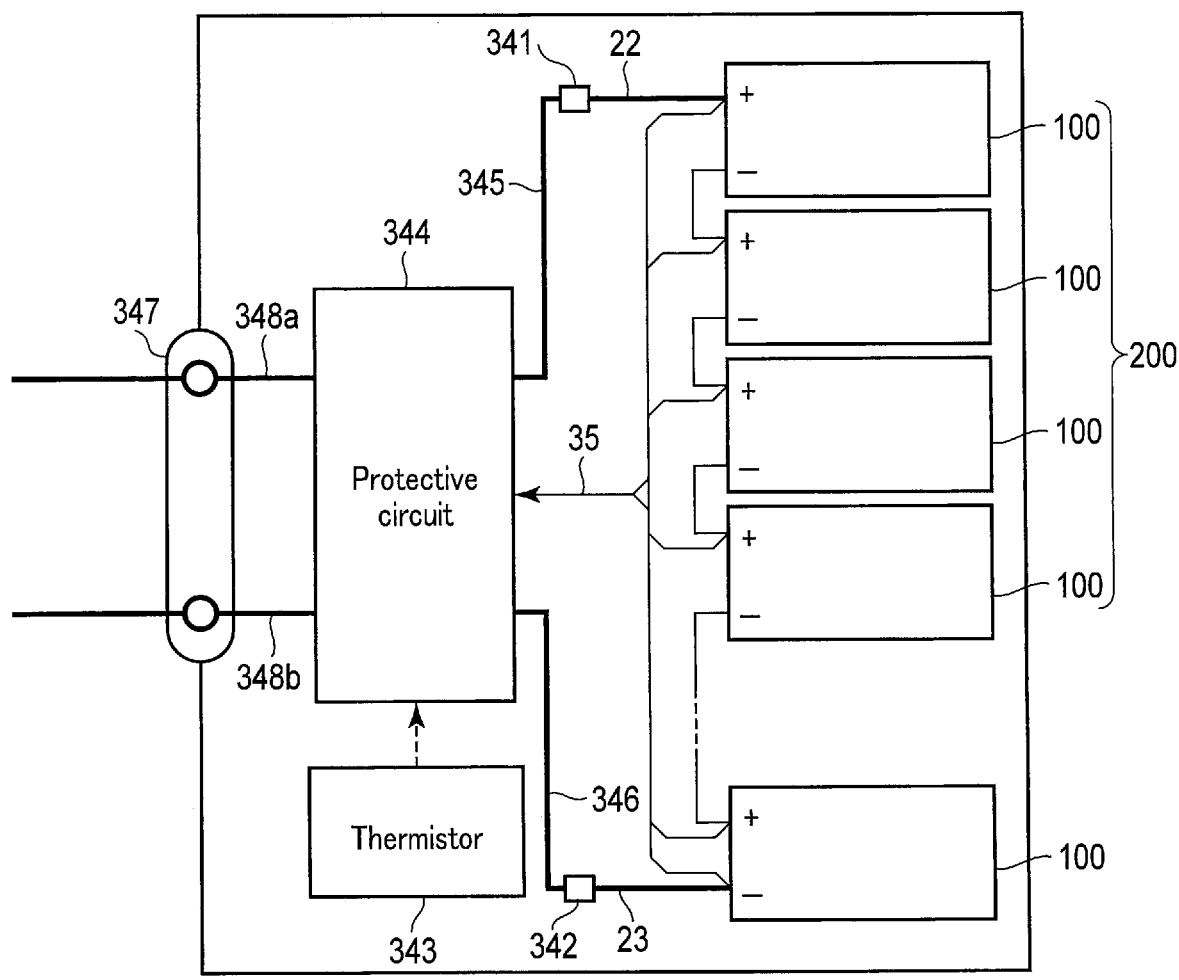
FIG. 9 is a block diagram illustrating an example of an electric circuit of the battery pack illustrated in FIG. 8.

FIG. 8 is an exploded perspective view schematically showing an example of the battery pack according to the fifth embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a bottomed prismatic container having a rectangular bottom surface. The housing container 31 is configured to house the protective sheets 33, battery module 200, printed wiring board 34, and wiring 35. The lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural single-batteries 100, a positive electrode-side lead 22, a negative electrode-side lead 23, and adhesive tapes 24.

The single-batteries 100 have a structure as shown in FIGS. 3 and 4. At least one of the plural single-batteries 100 is the secondary battery according to the third embodiment. The single-batteries 100 are stacked in an aligned manner such that the externally extending negative electrode terminals 6 and positive electrode terminals 7 are oriented toward the same direction. The single-batteries 100 are electrically connected in series as shown in FIG. 8. The single-batteries 100 may be electrically connected in parallel, or may be connected in a combination of in-series and in-parallel. When the single-batteries 100 are connected in parallel, the battery capacity increases as compared with the case where they are connected in series.

The adhesive tapes 24 fasten the single-batteries 100. Instead of the adhesive tapes 24, a heat-shrinkable tape may be used to fix the single-batteries 100. In this case, protective sheets 33 are disposed on both side surfaces of the battery module 200, the heat-shrinkable tape is wound around, and then the heat-shrinkable tape is heat-shrunk to bind the single-batteries 100.

One end of the positive electrode-side lead 22 is connected to the positive electrode terminal 7 of the unit cell 100 positioned lowermost in the stack of the single-batteries 100. One end of the negative electrode-side lead 23 is connected to the negative electrode terminal 6 of the single-batteries 100 positioned uppermost in the stack of the single-batteries 100.

The printed wiring board 34 is provided along one of inner surfaces of the housing container 31 in a short-side direction. The printed wiring board 34 includes a positive electrode-side connector 341, a negative electrode-side connector 342, a thermistor 343, a protective circuit 344, wirings 345 and 346, an external power distribution terminal 347, a plus-side wire 348a, and a minus-side wire 348b. One principal surface of the printed wiring board 34 faces a surface of the battery module 200 from which the negative electrode terminal 6 and the positive electrode terminal 7 extend. An insulating plate (not illustrated) is interposed between the printed wiring board 34 and the battery module 200.

The positive electrode-side connector 341 is provided with a through hole. When the other end of the positive electrode-side lead 22 is inserted into the through hole, the positive electrode-side connector 341 and the positive electrode-side lead 22 are electrically connected. The negative electrode-side connector 342 is provided with a through hole. When the other end of the negative electrode-side lead 23 is inserted into the through hole, the negative electrode-side connector 342 and the negative electrode-side lead 23 are electrically connected.

The thermistor 343 is fixed to one principal surface of the printed wiring board 34. The thermistor 343 detects a temperature of each of the single-batteries 100 and transmits a detection signal thereof to the protective circuit 344.

The external power distribution terminal 347 is fixed to the other principal surface of the printed wiring board 34. The external power distribution terminal 347 is electrically connected to device(s) existing outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Further, the protective circuit 344 is electrically connected to each of the single-batteries 100 via wiring 35.

The protective sheets 33 are disposed on both inner side surfaces in a long side direction of the housing container 31 and an inner side surface in the short side direction facing the printed wiring board 34 via the battery module 200. The protective sheets 33 are made of, for example, resin or rubber.

The protective circuit 344 controls charge and discharge of the single-batteries 100. In addition, the protective circuit 344 cuts off electrical connection between the protective circuit 344 and the external power distribution terminal 347 to external device(s), based on a detection signal transmitted from the thermistor 343 or a detection signal transmitted from each of the single-batteries 100 or the battery module 200.

An example of the detection signal transmitted from the thermistor 343 is a signal indicating that the temperature of the single-battery(s) 100 is detected to be a predetermined temperature or more. An example of the detection signal transmitted from each single-battery 100 or the battery module 200 is a signal indicating detection of over-charge, over-discharge, or overcurrent of the single-battery(s) 100. When detecting over-charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

The battery pack 300 may include plural battery modules 200. In this case, the battery modules 200 may be connected in series, may be connected in parallel, or may be connected in a combination of in-series and in-parallel. Further, the printed wiring board 34 and the wiring 35 may be omitted. In this case, the positive electrode-side lead 22 and the negative electrode-side lead 23 may be used as external power distribution terminals.

Such a battery pack is used for, for example, an application demanded to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

A battery pack according to a fifth embodiment includes the secondary battery according to the third embodiment or the battery module according to the fourth embodiment. Therefore, this battery pack can exhibit excellent output performance and cycle life performance.

SIXTH EMBODIMENT

According to the sixth embodiment, a vehicle is provided. The vehicle includes the battery pack according to the fifth embodiment.

In a vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two- to four-wheeled hybrid electric automobiles, two- to four-wheeled electric automobiles, electric assist bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

The vehicle according to a sixth embodiment may have plural battery packs installed thereon. In this case, the battery packs may be electrically connected in series, may be electrically connected in parallel, or may be electrically connected in a combination of in-series and in-parallel.

Next, an example of the vehicle according to the sixth embodiment will be described with reference to the drawings.

Figure 10:
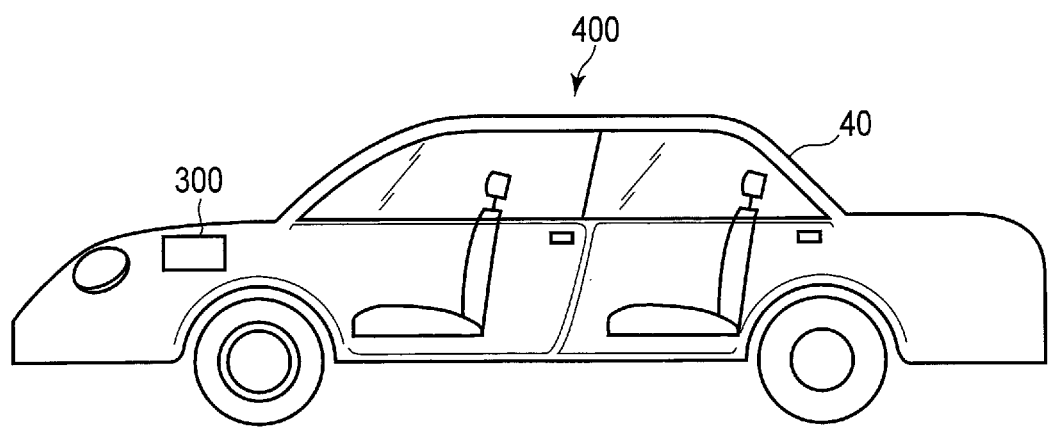
FIG. 10 is a cross-sectional view schematically illustrating an example of a vehicle according to an embodiment.

FIG. 10 is a cross-sectional view schematically illustrating an example of the vehicle according to the sixth embodiment.

A vehicle 400 illustrated in FIG. 10 includes a vehicle body 40 and a battery pack 300 according to the fifth embodiment. In the example illustrated in FIG. 10, the vehicle 400 is a four-wheeled automobile.

The vehicle 400 may have plural battery packs 300 installed thereon. In this case, the battery packs 300 may be connected in series, may be connected in parallel, or may be connected in a combination of in-series and in-parallel.

In FIG. 10, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the sixth embodiment will be described with reference to FIG. 11.

Figure 11:
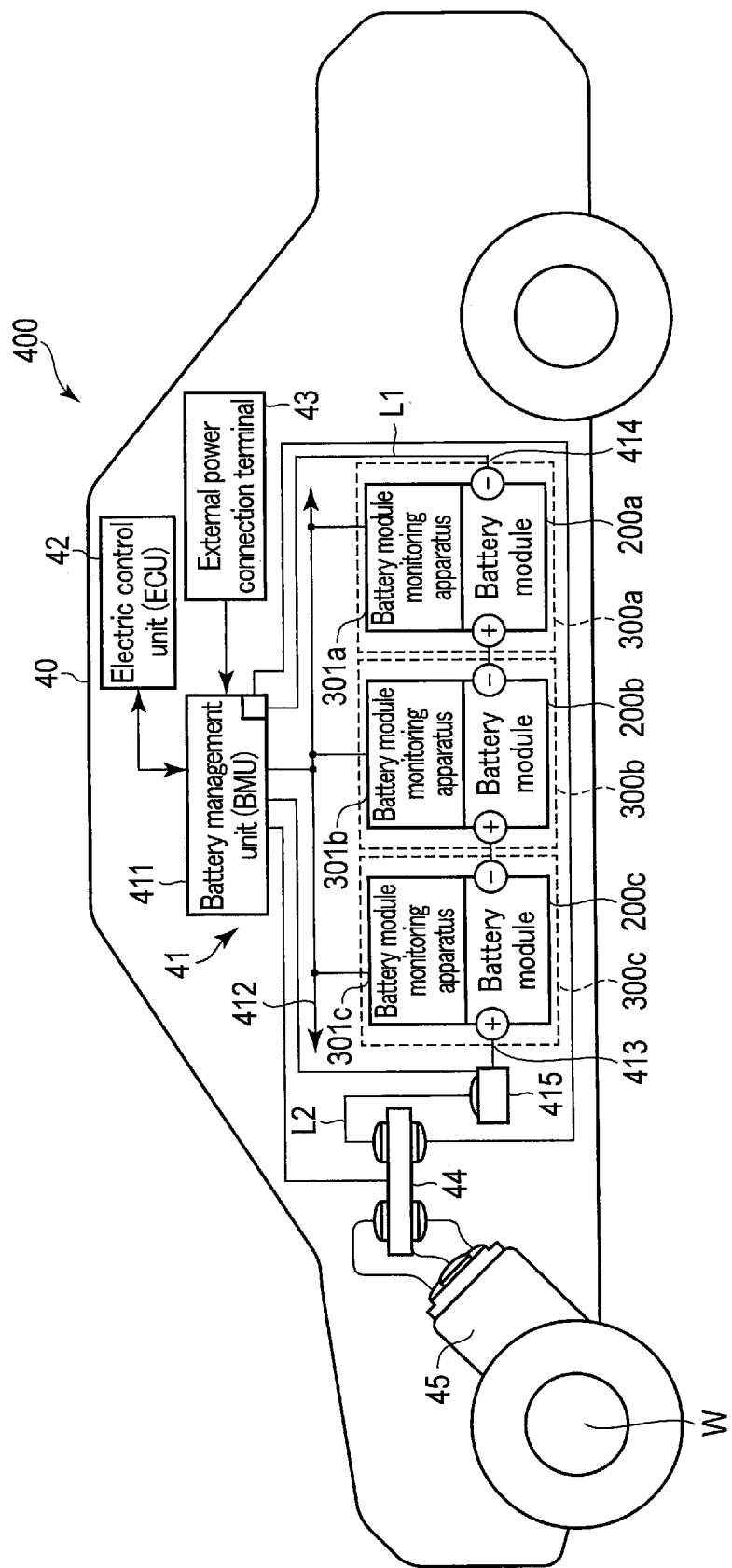
FIG. 11 is a diagram schematically illustrating another example of the vehicle according to the embodiment.

FIG. 11 is a schematic illustration of an example of the vehicle according to the sixth embodiment. The vehicle 400 illustrated in FIG. 11 is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b, and 300c are electrically connected in series. The battery pack 300a includes a battery module 200a and a battery module monitoring apparatus 301a (for example, voltage temperature monitoring: VTM). The battery pack 300b includes a battery module 200b and a battery module monitoring apparatus 301b. The battery pack 300c includes a battery module 200c and a battery module monitoring apparatus 301c. Each of the battery packs 300a, 300b, and 300c can be independently removed, and may be replaced with another battery pack 300.

Each of the battery modules 200a to 200c includes plural single-batteries connected in series. At least one of the single-batteries is the secondary battery according to the third embodiment. Each of the battery modules 200a to 200c perform charging and discharging through a positive electrode terminal 413 and a negative electrode terminal 414.

, In order to collect information concerning maintenance of the vehicle power source 41, a battery management unit 411 communicates with the battery module monitoring apparatuses 301a to 301c, and collects information relevant to the voltage, temperature, and the like of the single-batteries 100 included in the battery modules 200a to 200c included in the vehicle power source 41.

A communication bus 412 is connected between the battery management unit 411 and the battery module monitoring apparatuses 301a to 301c. The communication bus 412 is configured to share a set of, communication lines among plural nodes (the battery management unit and one or more battery module monitoring apparatuses). The communication bus 412 is a communication bus configured based on, for example, a control area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also include an electromagnetic contactor (for example, a switch device 415 illustrated in FIG. 11) for turning on and off the connection to the positive electrode terminal 413 and the negative electrode terminal 414. The switch device 415 includes a precharge switch (not illustrated) that is turned on when the battery modules 200a to 200c are charged, and a main switch (not illustrated) that is turned on when a battery output is supplied to a load. The precharge switch and the main switch include a relay circuit (not illustrated) that is turned on or off by a signal supplied to a coil disposed near a switch element.

An inverter 44 converts an input DC voltage into a three-phase alternating current (AC) high voltage for motor driving. Three-phase output terminals of the inverter 44 are connected to three-phase input terminals of a drive motor 45. The inverter 44 controls an output voltage, based on a control signal from the battery management unit 411 or a vehicle ECU 42 for controlling the operation of the entire vehicle.

The drive motor 45 is rotated by power supplied from the inverter 44. This rotation is transmitted to an axle (s) and drive wheels W via, for example, a differential gear unit.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connection line L1 is connected to the negative electrode terminal 414 of the vehicle power source 41 via a current detection unit (not illustrated) in the battery management unit 411. The other terminal of the connection line L1 is connected to the negative electrode input terminal of the inverter 44.

One terminal of a connection line L2 is connected to the positive electrode terminal 413 of the vehicle power source 41 via the switch apparatus 415. The other terminal of the connection line L2 is connected to the positive electrode input terminal of the inverter 44.

The external terminal 43 is connected to the battery management apparatus 411. The external terminal 43 can be connected to, for example, an external power source.

The vehicle ECU 42 cooperatively controls the battery management unit 411 together with other apparatuses in response to an operation input by a driver or the like, and thus manages the entire vehicle. Between the battery management unit 411 and the vehicle ECU 42, data related to maintenance of the vehicle power source 41, such as a remaining capacity of the vehicle power source 41, is transferred via a communication line.

The vehicle according to the sixth embodiment has the battery pack according to the fifth embodiment installed thereon. Therefore, according to the present embodiment, it is possible to provide a vehicle installed with a battery pack capable of exhibiting excellent output performance and cycle life performance.

EXAMPLES

Hereinafter, the above embodiments will be described in more detail based on examples.

Synthesis Method

Example 1

A niobium-titanium composite oxide was synthesized by a solid phase synthesis method described below. The synthesis method according to Example 1 is a method corresponding to the first synthesis method described in the first embodiment.

First, $Nb_2O_5$ particles with a D50 of 0.6 μm and $TiO_2$ particles with a D50 of 0.5 μm were prepared. Mixing was performed by dry ball milling with a molar ratio between the $Nb_2O_5$ particles and the $TiO_2$ particles being 2.5:1, so as to obtain an $Nb_{10}Ti_2O_{29}$ phase. The obtained powder was placed in an alumina crucible and subjected to pre-firing (first firing) at a temperature of 800° C. for 12 hours. After the pre-firing, the obtained powder was placed in a platinum crucible and subjected to main firing at 1100° C. for 12 hours. After the main firing, the powder was ground and mixed in an agate mortar and passed through a 25-μm mesh sieve to remove coarse particles, whereby an $Nb_{10}Ti_2O_{29}$ phase was obtained. The obtained niobium-titanium composite oxide contained only primary particles solely of the $Nb_{10}Ti_2O_{29}$ phase.

Next, a solid phase synthesis method was performed in a similar manner as in the synthesis of the $Nb_{10}Ti_2O_{29}$ phase, except that the molar ratio between the $Nb_2O_5$ particles and the $TiO_2$ particles was made 12:1 so as to obtain an $Nb_{24}TiO_{64}$ phase. The obtained niobium-titanium composite oxide contained only primary particles solely of the $Nb_{24}TiO_{64}$ phase.

With respect to 100 parts by mass of the sole phase primary particles of $Nb_{10}Ti_2O_{29}$ phase, 75 parts by mass of the sole phase primary particles of $Nb_{24}TiO_{64}$ phase were mixed, and the mixed particles were subjected to dry ball milling. The obtained powder was placed in an alumina crucible and fired at a temperature of 800° C. for 1 hour, whereby an active material according to Example 1 was obtained.

Example 2

An active material was obtained by the method described in Example 1, except that with respect to 100 parts by mass of the sole phase primary particles of $Nb_{10}Ti_2O_{29}$ phase, 66 parts by mass of sole phase primary particles of $Nb_{14}TiO_{37}$ phase was mixed.

The sole phase primary particles of $Nb_{14}TiO_{37}$ phase were synthesized in the same manner as the synthesis of the $Nb_{10}Ti_2O_{29}$ phase according to Example 1, except that the molar ratio between the $Nb_2O_5$ particles and the $TiO_2$ particles was 7:1.

Example 3

An active material was obtained by the method described in Example 1, except that with respect to 100 parts by mass of the sole phase primary particles of the $Nb_{10}Ti_2O_{29}$ phase, 55 parts by mass of the sole phase primary particles of $Nb_{24}TiO_{64}$ phase was mixed. As the sole phase primary particles of $Nb_{24}TiO_{64}$ phase, the same particles as those synthesized in Example 1 were used.

Example 4

A niobium-titanium composite oxide was synthesized by a solid phase synthesis method described below. The synthesis method according to Example 4 is a method corresponding to the second synthesis method described in the first embodiment.

First, $Nb_2O_5$ particles with a D50 of 0.3 μm and $TiO_2$ particles with a D50 of 0.2 μm were prepared. Mixing was performed by dry ball milling with a molar ratio between the $Nb_2O_5$ particles and the $TiO_2$ particles being 7:1. The obtained powder was placed in an alumina crucible and subjected to pre-firing (first firing) at a temperature of 800° C. for 12 hours. After the pre-firing, the obtained powder was placed in a platinum crucible and subjected to main firing at 1000° C. for 12 hours.

By performing, in this manner, synthesis in an appropriate temperature range not exceeding 1200° C., the generation of the $Nb_{14}TiO_{37}$ phase as a single phase can be suppressed, and thereby achieve phase separation into a mixed phase of the $Nb_{24}TiO_{64}$ phase and the $Nb_{10}Ti_2O_{29}$ phase within the primary particles.

After the main firing, the resultant powder was ground and mixed in an agate mortar and passed through a 25-μm mesh sieve to remove coarse particles, whereby an active material according to Example 4 was synthesized.

Example 5

An active material powder according to Example 5 was synthesized by the same method as described in Example 4, except that pre-firing was not performed.

Example 6

An active material powder according to Example 6 was synthesized by the same method as described in Example 4, except that main firing was performed for 2 hours.

Example 7

An active material powder according to Example 7 was synthesized by the same method as described in Example 4, except that main firing was performed for 10 hours.

Example 8

An active material powder according to Example 8 was synthesized by the same method as described in Example 5, except that the molar ratio between the $Nb_2O_5$ particles and the $TiO_2$ particles was changed to 7.1:1, and that $SiO_2$, $Fe_2O_3$ and $Ta_2O_5$ were added to the raw material in an amount of 0.1 atm % each with respect to the Nb element.

Example 9

An active material powder according to Example 9 was synthesized by the same method as described in Example 5, except that the molar ratio between the $Nb_2O_5$ particles and the $TiO_2$ particles was changed to 8:1, and that KCl was added to the raw material in an amount of 0.5 atm % with respect to the Nb element, and $Na_2CO_3$, $P_2O_5$, and $SnO_2$ were each added to the raw material in an amount of 0.05 atm % with respect to the Nb element.

Example 10

An active material powder according to Example 10 was synthesized by the same method as described in Example 5, except that the molar ratio between the $Nb_2O_5$ particles and the $TiO_2$ particles was changed to 12:1.

Comparative Example 1

An active material powder was obtained by the method described in Example 1, except that with respect to 100 parts by mass of the sole phase primary particles of $Nb_{10}Ti_2O_{29}$ phase, 30 parts by mass of sole phase primary particles of $Nb_{14}TiO_{37}$ phase was mixed.

Comparative Example 2

An active material powder according to Comparative Example 2 was obtained by the same method as described in Example 5, except that the molar ratio between the $Nb_2O_5$ particles and the $TiO_2$ particles was changed to 1:1.

Comparative Example 3

The powder composed only of the sole phase primary particles of $Nb_{10}Ti_2O_{29}$ phase obtained in Example 1 was used as an active material powder according to Comparative Example 3

Comparative Example 4

The powder composed only of the sole phase primary particles of $Nb_{14}TiO_{37}$ phase obtained in Example 2 was used as an active material powder according to Comparative Example 4.

Comparative Example 5

The powder composed only of the sole phase primary particles of $Nb_{24}TiO_{64}$ phase obtained in Example 1 was used as an active material powder according to Comparative Example 5.

Comparative Example 6

An active material powder according to Comparative Example 6 was obtained by the same method as described in Example 5, except that $Nb_2O_5$ particles with a D50 of 3.2 μm and $TiO_2$ particles with a D50 of 2.2 μM were used as raw material particles.

Comparative Example 7

An active material powder according to Comparative Example 7 was obtained by the same method as described in Example 5, except that the temperature at the time of main firing was changed to 1400° C.

Comparative Example 8

The sole phase primary particles of $Nb_{10}Ti_2O_{29}$ phase and the sole phase primary particles of $Nb_{24}TiO_{64}$ phase prepared by the same method as described in Example 1 were mixed in a dry ball mill to obtain an active material powder according to Comparative Example 8.

<Powder X-Ray Diffraction Measurement and Calculation of Peak Intensity Ratio $I_B/I_A$>

The powder X-ray diffraction measurement described in the first embodiment was performed on the active material powders obtained in Examples 1 to 11 and Comparative Examples 1 to 3 under conditions of a sampling interval of 0.01° and a scanning rate of 2°/min. In the obtained diffraction chart, the peak intensity ratio $I_B/I_A$ was calculated.

Figure 12:
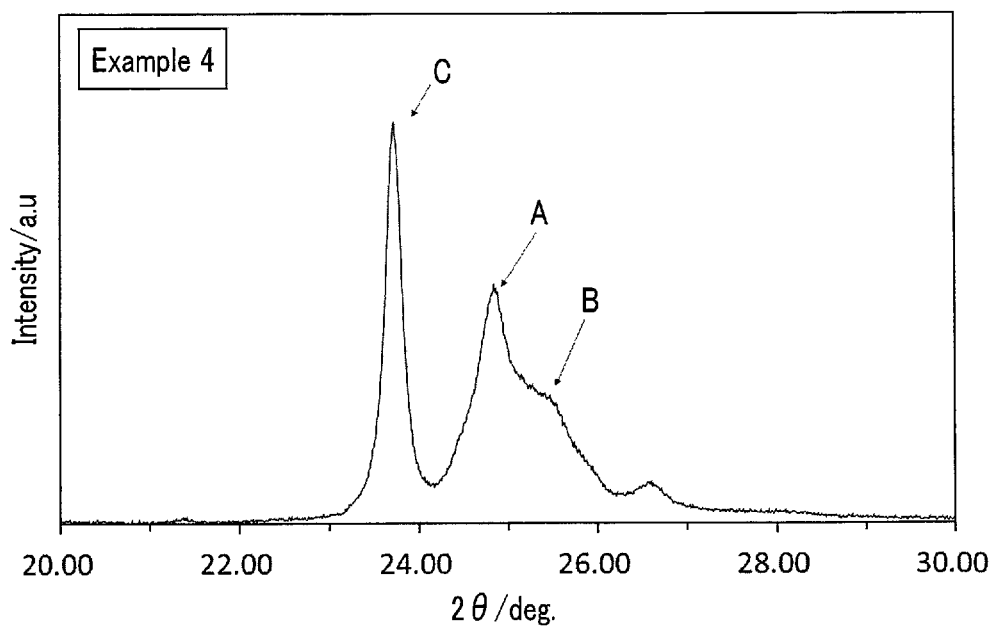
FIG. 12 is a diagram illustrating a diffraction chart obtained by powder X-ray diffraction measurement according to Example 4.
Figure 13:
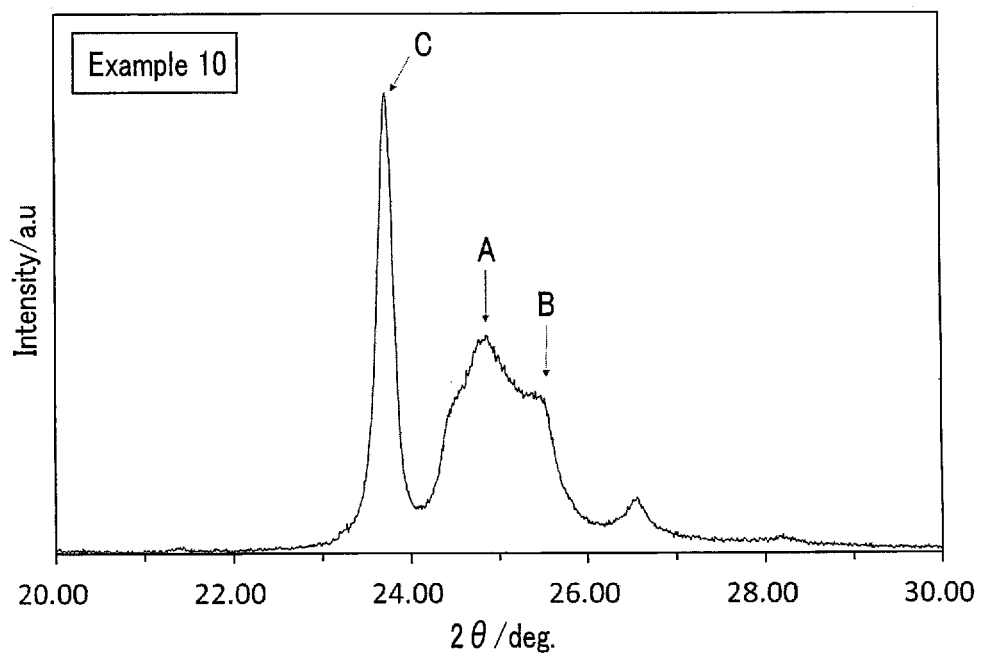
FIG. 13 is a diagram illustrating a diffraction chart obtained by powder X-ray diffraction measurement according to Example 10.

As an example, FIG. 12 shows a diffraction chart obtained by powder X-ray diffraction for the active material according to Example 4. FIG. 13 shows a diffraction chart obtained by powder X-ray diffraction for the active material according to Example 10. FIG. 14 shows a diffraction chart obtained by powder X-ray diffraction for the active material according to Comparative Example 3.

In each of the diffraction charts shown in FIGS. 12 and 13, a peak A, the maximum peak appearing within a range of 2θ of 24.9±0.2°, which was assigned to the $Nb_{10}Ti_2O_{29}$ phase, was observed. Also, in each of the diffraction charts shown in FIGS. 12 and 13, a peak B, the maximum peak appearing within a range of 2θ of 25.5±0.2°, which was assigned to the Nb-rich phase, was observed. Also, in each of the diffraction charts shown in FIGS. 12 and 13, a peak C, the maximum peak appearing within a range of 2θ of 23.7±0.2°, which was assigned to the $Nb_{10}Ti_2O_{29}$ phase, was observed.

When the peak intensity ratio $I_B/I_A$ was calculated from the peaks A and B observed in FIG. 12, the peak intensity ratio $I_B/I_A$ of the active material according to Example 4 was 0.62. The half width of the peak C observed in the diffraction chart shown in FIG. 12 was 0.32°.

When the peak intensity ratio $I_B/I_A$ was calculated from the peaks A and B observed in FIG. 13, the peak intensity ratio $I_B/I_A$ of the active material according to Example 10 was 0.82. The half width of the peak C observed in the diffraction chart shown in FIG. 13 was 0.35°.

In the diffraction chart shown in FIG. 14, a peak A, the maximum peak appearing within a range of 2θ of 24.9±0.2°, which was assigned to the $Nb_{10}Ti_2O_{29}$ phase, was observed. Also, in the diffraction chart shown in FIG. 14, a peak C, the maximum peak appearing within a range of 2θ of 23.7±0.2°, which was assigned to the $Nb_{10}Ti_2O_{29}$ phase, was observed. However, in the diffraction chart shown in FIG. 14, a peak B, as a maximum peak appearing within a range of 2θ of 25.5±0.2° and attributed to the Nb-rich phase, was not observed.

When the peak intensity ratio $I_B/I_A$ was calculated from the peaks A and B observed in FIG. 14, the peak intensity ratio $I_B/I_A$ of the active material according to Comparative Example 3 was 0. The half width of the peak C observed in the diffraction chart shown in FIG. 14 was 0.12°.

<Sem-Edx Observation>

The active material powders obtained in Examples 1 to 10 and Comparative Examples 1 to 8 were observed by SEM-EDX, and the ratio $M_{Nb}/M_{Ti}$ of a substance amount of niobium to a substance amount of titanium in the primary particles contained in each of the active material powders was examined.

<Electrochemical Measurement>

First, 100% by mass of the niobium-titanium composite oxide powder obtained in each example, 10%, by mass of acetylene black and 5% by mass of carbon nanofiber as electro-conductive agents, and 10% by mass of polyvinylidene fluoride (PVdF) as a binder were added to N-methylpyrrolidone (NMP) and mixed to provide a slurry. The slurry was applied onto one side of a current collector made of an aluminum foil having a thickness of 12 μm, dried, and pressed, whereby an electrode having an electrode density of 2.4 g/cm³ was prepared.

Next, an electrolyte solution was prepared by dissolving $LiPF_6$ supporting salt at a concentration of 1 mol/L in a mixed solvent in which ethylene carbonate (EC) and diethyl carbonate (DEC) were mixed at a volume ratio of 1:2.

The obtained electrode was used as a working electrode and Li metal was used respectively as a counter electrode and a reference electrode to prepare a coin cell using the obtained electrolytic solution, and electrochemical performance thereof was evaluated.

In the present examples, since the lithium metal is used as the counter electrode in the coin cell for measurement, electrode potentials of the Examples and the Comparative Examples are more noble than that of the counter electrode, and thus, the electrodes according to the Examples and Comparative Examples operate as positive electrodes. Therefore, the definitions of charging and discharging would be opposite when the electrodes of the Examples and the Comparative Examples are used as negative electrodes. In order to avoid contusion, herein regarding the present examples, directions in which lithium ions are inserted into the electrode are collectively referred to as charging, and directions of extracting lithium ions from the electrode are consistently referred to as discharging. Note, that the active materials according to the embodiment operate as a negative electrode, when used in combination with a known positive electrode material.

The prepared electrochemical measurement cell was charged and discharged within a potential range of 1.0 V to 3.0 V relative to metallic lithium electrode. A charge/discharge current value was set to 0.2 C (hourly discharge rate), and 0.2 C discharge capacity was examined at room temperature. The value of 0.2 C discharge capacity is an index of energy density.

Next, the cells of the Examples and the Comparative Examples were subjected to a life test in which 1 C charge and discharge were repeated within a potential range of 1.0 V to 3.0 V relative to metallic lithium electrode at room temperature. Under such conditions, charge and discharge were repeated 100 cycles (a charge and a discharge is defined as one cycle), and a discharge capacity retention ratio after 100 cycles was investigated. In addition, in order to evaluate the charge/discharge rate performance, the charge or discharge current value was varied between 1 C and 5 C, and the capacity retention ratio at each current was measured.

The above results are summarized in Tables 1 to 4. In Tables 1 and 2, the column "raw material molar ratio ($Nb_2O_5:TiO_2$) in sole phase particle synthesis" indicates the mixing molar ratio between the $Nb_2O_5$ particles and the $TiO_2$ particles used as starting materials when particles of each crystal phase were prepared in the first synthesis method. The column "raw material molar ratio $Nb_2O_5:TiO_2$" indicates the mixing molar ratio between the $Nb_2O_5$ particles and the $TiO_2$ particles used as starting materials in the second synthesis method.

TABLE 1

| Table 1 | Synthesis method | Raw material molar ratio ($Nb_2O_5:TiO_2$) in sole phase particle synthesis | | | Mass ratio when mixing sole phase particles | Firing conditions after mixing sole phase particles |
| --- | --- | --- | --- | --- | --- | --- |
| | | $Nb_{10}Ti_2O_{29}$ phase particle | $Nb_{14}TiO_{37}$ phase particle | $Nb_{24}TiO_{64}$ phase particle | | |
| Example 1 | First synthesis method | 2.5:1 | — | 12:1 | $Nb_{10}Ti_2O_{29}$ phase:$Nb_{24}TiO_{64}$ phase = 100:75 | 800° C., 1 hr |
| Example 2 | First synthesis method | 2.5:1 | 7:1 | — | $Nb_{10}Ti_2O_{29}$ phase:$Nb_{14}TiO_{37}$ phase = 100:66 | 800° C., 1 hr |
| Example 3 | First synthesis method | 2.5:1 | — | 12:1 | $Nb_{10}Ti_2O_{29}$ phase:$Nb_{24}TiO_{64}$ phase = 100:55 | 800° C., 1 hr |

TABLE 1-continued

| | | | | | |
|---|---|---|---|---|---|
| Example 4 | Second synthesis method | — | — | — | — |
| Example 5 | Second synthesis method | — | — | — | — |
| Example 6 | Second synthesis method | — | — | — | — |
| Example 7 | Second synthesis method | — | — | — | — |
| Example 8 | Second synthesis method | — | — | — | — |
| Example 9 | Second synthesis method | — | — | — | — |
| Example 10 | Second synthesis method | — | — | — | — |

| Table 1 | Raw material molar ratio $Nb_2O_5:TiO_2$ | Raw material average particle size D50 (μm) | Pre-firing conditions | Main firing conditions | Additive elements |
|---|---|---|---|---|---|
| Example 1 | — | $Nb_2O_5$: 0.6<br>$TiO_2$: 0.5 | — | — | — |
| Example 2 | — | $Nb_2O_5$: 0.6<br>$TiO_2$: 0.5 | — | — | — |
| Example 3 | — | $Nb_2O_5$: 0.6<br>$TiO_2$: 0.5 | — | — | — |
| Example 4 | 7:1 | $Nb_2O_5$: 0.3<br>$TiO_2$: 0.2 | 800° C., 12 h | 1000° C., 12 h | — |
| Example 5 | 7:1 | $Nb_2O_5$: 0.3<br>$TiO_2$: 0.2 | None | 1000° C., 12 h | — |
| Example 6 | 7:1 | $Nb_2O_5$: 0.3<br>$TiO_2$: 0.2 | None | 1000° C., 2 h | — |
| Example 7 | 7:1 | $Nb_2O_5$: 0.3<br>$TiO_2$: 0.2 | None | 1000° C., 10 h | — |
| Example 8 | 7.1:1 | $Nb_2O_5$: 0.3<br>$TiO_2$: 0.2 | None | 1000° C., 12 h | Si, Fe, Ta |
| Example 9 | 8:1 | $Nb_2O_5$: 0.3<br>$TiO_2$: 0.2 | None | 1000° C., 12 h | Na, P, Sn |
| Example 10 | 12:1 | $Nb_2O_5$: 0.3<br>$TiO_2$: 0.2 | None | 1000° C., 12 h | — |

TABLE 2

| Table 2 | Synthesis method | Raw material molar ratio ($Nb_2O_5:TiO_2$) in sole phase particle synthesis | | | Mass ratio when mixing sole phase particles | Firing conditions after mixing sole phase particles |
|---|---|---|---|---|---|---|
| | | $Nb_{10}Ti_2O_{29}$ phase particle | $Nb_{14}TiO_{37}$ phase particle | $Nb_{24}TiO_{64}$ phase particle | | |
| Comparative Example 1 | First synthesis method | 2.5:1 | 7:1 | — | $Nb_{10}Ti_2O_{29}$ phase:$Nb_{14}TiO_{37}$ phase = 100:30 | 800° C., 1 hr |
| Comparative Example 2 | Second synthesis method | — | — | — | — | — |
| Comparative Example 3 | First synthesis method | 2.5:1 | — | — | — | — |
| Comparative Example 4 | First synthesis method | — | 7:1 | — | — | — |

TABLE 2-continued

| Table 2 | | | | | |
|---|---|---|---|---|---|
| Comparative Example 5 | First synthesis method | — | — | 12:1 | — | — |
| Comparative Example 6 | Second synthesis method | — | — | — | — | — |
| Comparative Example 7 | Second synthesis method | — | — | — | — | — |
| Comparative Example 8 | First synthesis method | 2.5:1 | — | 12:1 | $Nb_{10}Ti_2O_{29}$ phase:$Nb_{24}TiO_{64}$ phase = 100:75 | — |

| Table 2 | Raw material molar ratio $Nb_2O_5$:$TiO_2$ | Raw material average particle size D50 (μm) | Pre-firing conditions | Main firing conditions | Additive elements |
|---|---|---|---|---|---|
| Comparative Example 1 | — | $Nb_2O_5$: 0.6 $TiO_2$: 0.5 | — | — | — |
| Comparative Example 2 | 1:1 | $Nb_2O_5$: 0.3 $TiO_2$: 0.2 | None | 1000° C., 12 h | — |
| Comparative Example 3 | — | $Nb_2O_5$: 0.3 $TiO_2$: 0.2 | — | — | — |
| Comparative Example 4 | — | $Nb_2O_5$: 0.3 $TiO_2$: 0.2 | — | — | — |
| Comparative Example 5 | — | $Nb_2O_5$: 0.3 $TiO_2$: 0.2 | — | — | — |
| Comparative Example 6 | 7:1 | $Nb_2O_5$: 3.2 $TiO_2$: 2.2 | None | 1000° C., 12 h | — |
| Comparative Example 7 | 7:1 | $Nb_2O_5$: 0.3 $TiO_2$: 0.2 | None | 1400° C., 12 h | — |
| Comparative Example 8 | — | $Nb_2O_5$: 0.6 $TiO_2$: 0.5 | — | — | — |

TABLE 3

| Table 3 | Peak intensity ratio $I_B/I_A$ | Peak intensity ratio $I_D/I_A$ | Half width of peak C (°) | Ratio $M_{Nb}/M_{Ti}$ within primary particle | 0.2 C discharge capacity (mAh/g) | 5 C/0.2 C discharge capacity retention ratio (%) | Cycle capacity retention ratio (%) |
|---|---|---|---|---|---|---|---|
| Example 1 | 1.20 | <0.01 | 0.21 | 7.8 | 252 | 95 | 92 |
| Example 2 | 0.80 | <0.01 | 0.20 | 6.8 | 262 | 93 | 94 |
| Example 3 | 0.80 | <0.01 | 0.22 | 7.1 | 260 | 94 | 93 |
| Example 4 | 0.62 | <0.01 | 0.32 | 7.0 | 263 | 96 | 93 |
| Example 5 | 0.63 | <0.01 | 0.35 | 7.1 | 262 | 95 | 94 |
| Example 6 | 0.62 | <0.01 | 0.42 | 6.9 | 261 | 96 | 93 |
| Example 7 | 0.61 | <0.01 | 0.32 | 7.0 | 262 | 96 | 94 |
| Example 8 | 0.62 | <0.01 | 0.29 | 7.1 | 261 | 95 | 94 |
| Example 9 | 0.69 | <0.01 | 0.28 | 7.9 | 252 | 94 | 92 |
| Example 10 | 0.82 | <0.01 | 0.35 | 11.9 | 245 | 92 | 92 |

TABLE 4

| Table 4 | Peak intensity ratio $I_B/I_A$ | Peak intensity ratio $I_D/I_A$ | Half width of peak C (°) | Ratio $M_{Nb}/M_{Ti}$ within primary particle | 0.2 C discharge capacity (mAh/g) | 5 C/0.2 C discharge capacity retention ratio (%) | Cycle capacity retention ratio (%) |
|---|---|---|---|---|---|---|---|
| Comparative Example 1 | 0 | <0.01 | 0.16 | 5.9 | 265 | 93 | 86 |
| Comparative Example 2 | 0 | 15 | 0.12 | 2.0 | 270 | 85 | 90 |

TABLE 4-continued

| Table 4 | Peak intensity ratio $I_B/I_A$ | Peak intensity ratio $I_D/I_A$ | Half width of peak C (°) | Ratio $M_{Nb}/M_{Ti}$ within primary particle | 0.2 C discharge capacity (mAh/g) | 5 C/0.2 C discharge capacity retention ratio (%) | Cycle capacity retention ratio (%) |
|---|---|---|---|---|---|---|---|
| Comparative Example 3 | 0 | <0.01 | 0.12 | 5.0 | 261 | 94 | 77 |
| Comparative Example 4 | 21 | <0.01 | 0.12 | 14 | 250 | 88 | 75 |
| Comparative Example 5 | 20 | <0.01 | 0.12 | 24 | 238 | 90 | 78 |
| Comparative Example 6 | 0.52 | 0.05 | 0.14 | 6.9 | 255 | 91 | 88 |
| Comparative Example 7 | 0.59 | <0.01 | 0.10 | 7.0 | 248 | 70 | 82 |
| Comparative Example 8 | 1.50 | <0.01 | 0.11 | — | 250 | 88 | 78 |

As presented in Examples 1 to 10, excellent rate performance and cycle life performance were exhibited by the active materials that had included the primary particle including an $Nb_{10}Ti_2O_{29}$ phase and at least one Nb-rich phase selected from the group consisting of an $Nb_{14}TiO_{37}$ phase and an $Nb_{24}TiO_{64}$ phase, with a ratio $M_{Nb}/M_{Ti}$ of a substance amount of niobium to a substance amount of titanium satisfying $5.0<M_{Nb}/M_{Ti}\leq24.0$, the active material satisfying the above formula (1), and a half width of the peak C being in a range of 0.15° or more and 0.80° or less.

As presented in Comparative Examples 1 to 3, when the peak intensity ratio $I_B/I_A$ is 0, these active materials do not include the Nb-rich phase. The active material particles according to the Comparative Examples 1 to 3 were more likely to crack than the active material particles according to the Examples, and thus tended to have a poor cycle capacity retention ratio.

As presented in Comparative Examples 4 and 5, when the peak intensity ratio $I_B/I_A$ exceeds 5.0, volume expansion of the active material particles tends to occur drastically, and the particles easily become cracked. Therefore, their cycle capacity retention ratio was poor.

In Comparative Example 6, since the particle size of the raw material particles was large, solid-phase diffusion was insufficient, and a relatively great amount of $Nb_2TiO_7$ phase having a small Nb/Ti ratio had generated in the generated particles. The active material according to Comparative Example 6 tended to be inferior in both rate performance and cycle life performance as compared to those according to Examples 1 to 10.

As in Comparative Example 7, when the temperature in the main firing is set to a relatively high temperature, Nb and Ti tend to be sufficiently diffused to generate a stable crystal phase. Namely, there are tendencies for the $Nb_{10}Ti_2O_{29}$ phase and at least one Nb-rich phase selected from the group consisting of the $Nb_{14}TiO_{37}$ phase and the $Nb_{24}TiO_{64}$ phase being discretely separated within the primary particle, and the respective crystal phases being localized. In such a state, within each crystal phase, weak portions of the crystal such as a vertex sharing portion are aligned along one direction, and thus the primary particles tend to be easily cracked by insertion and extraction of lithium ions. Therefore, the cycle capacity retention ratio tends to be poor.

The active material powder according to Comparative Example 8 was obtained by simply mixing the sole phase primary particles of $Nb_{10}Ti_2O_{29}$ phase and the sole phase primary particles of $Nb_{24}TiO_{64}$ phase. Namely, the subsequent firing was not performed. This active material had a peak intensity ratio $I_B/I_A$ satisfying the above formula (1), but did not contain phase-separated primary particles, and thus, there tended for particle cracking to easily occur, and for lithium movement between active material particles having different crystal phases to not be smoothly performed.

According to at least one embodiment and example described above, an active material is provided. The active material includes a primary particle, where the primary particle includes an $Nb_{10}Ti$ 2029 phase and at least one Nb-rich phase selected from the group consisting of an $Nb_{14}TiO_{37}$ phase and an $Nb_{24}TiO_{64}$ phase. In the primary particle, a ratio $M_{Nb}/M_{Ti}$ of a substance amount of niobium to a substance amount of titanium satisfies $5.0<M_{Nb}/M_{Ti}\leq24.0$. A diffraction chart according to a wide angle X-ray diffraction method using a CuKα ray as an X-ray source for the active material has: a peak A which appears within a range of 2θ of 24.9±0.2° and is attributed to the $Nb_{10}Ti_2O_{29}$ phase, a peak B which appears within a range of 2θ of 25.5±0.2° and is attributed to the Nb-rich phase, and a peak C which appears within a range of 2θ of 23.7 ±0.2° and is attributed to the $Nb_{10}Ti_2O_{29}$ phase. The active material satisfies a peak intensity ratio represented by the following formula (1).

$$0<I_B/I_A<5.0 \tag{1}$$

In formula (1), $I_A$ is a peak intensity of the peak A, and $I_B$ is a peak intensity of the peak B. A half width of the peak C is in a range of 0.15° or more and 0.80° or less.

This active material can realize a secondary battery capable of exhibiting excellent output performance and cycle life performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a primary particle,
the primary particle comprising an $Nb_{10}Ti_2O_{29}$ phase and at least one Nb-rich phase selected from the group consisting of an $Nb_{14}TiO_{37}$ phase and an $Nb_{24}TiO_{64}$ phase,
a molar ratio Nb/Ti of niobium to titanium in the primary particle satisfying $5.0 < Nb/Ti \leq 24.0$,
a diffraction chart according to a wide angle X-ray diffraction method using a CuKα ray as an X-ray source for the active material comprising:
a peak A appearing within a range of 2θ of 24.9±0.2° attributed to the $Nb_{10}Ti_2O_{29}$ phase;
a peak B appearing within a range of 2θ of 25.5±0.2° attributed to the Nb-rich phase; and
a peak C appearing within a range of 2θ of 23.7±0.2° attributed to the $Nb_{10}Ti_2O_{29}$ phase,
the active material satisfying a first peak intensity ratio represented by following formula (1) and a second peak intensity ratio represented by following formula (2):

$$0 < I_B/I_A < 5.0 \quad (1)$$

$$0 \leq I_D/I_A < 0.01 \quad (2)$$

where $I_A$ is a peak intensity of the peak A, $I_B$ is a peak intensity of the peak B, and $I_D$ is a peak intensity of a peak D appearing within a range of 2θ of 20.1±0.2° attributed to the $Nb_2TiO_7$ phase in the diffraction chart, and
a half width of the peak C being in a range of 0.15° or more and 0.80° or less.

2. The active material according to claim 1, wherein the first peak intensity ratio $I_B/I_A$ is within a range of 0.01 or more and 1.20 or less.

3. The active material according to claim 1, wherein the molar ratio Nb/Ti satisfies $6.5 \leq Nb/Ti \leq 12.0$.

4. The active material according to claim 1, wherein the half width of the peak C is within a range of 0.20° or more and 0.45° or less.

5. The active material according to claim 1, further comprising at least one selected from the group consisting of Ta, K, and P.

6. An electrode comprising the active material according to claim 1.

7. The electrode according to claim 6, wherein the electrode comprises an active material-containing layer containing the active material.

8. A secondary battery comprising:
a positive electrode;
a negative electrode; and
an electrolyte,
wherein the negative electrode is the electrode according to claim 6.

9. A battery pack comprising the secondary battery according to claim 8.

10. The battery pack according to claim 9, further comprising:
an external power distribution terminal; and
a protective circuit.

11. The battery pack according to claim 9, further comprising plural of the secondary battery, the secondary batteries being electrically connected in series, in parallel, or in a combination of in series and in parallel.

12. A vehicle comprising the battery pack according to claim 9.

13. The vehicle according to claim 12, further comprising a mechanism that converts kinetic energy of the vehicle into regenerative energy.

* * * * *